(12) United States Patent
Goto et al.

(10) Patent No.: US 7,408,708 B2
(45) Date of Patent: Aug. 5, 2008

(54) DIFFUSING SHEET, SURFACE LIGHT SOURCE UNIT, AND TRANSMISSION TYPE DISPLAY

(75) Inventors: Masahiro Goto, Shinjuku-Ku (JP); Mitsuru Iida, Shinjuku-Ku (JP); Wataru Tokuhara, Shinjuku-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 233 days.

(21) Appl. No.: 11/098,759

(22) Filed: Apr. 4, 2005

(65) Prior Publication Data
US 2005/0270654 A1 Dec. 8, 2005

(30) Foreign Application Priority Data
Apr. 16, 2004 (JP) ............................. 2004-121054
Jun. 21, 2004 (JP) ............................. 2004-182139
Jul. 30, 2004 (JP) ............................. 2004-224393

(51) Int. Cl.
*G03B 21/60* (2006.01)
*G03B 21/56* (2006.01)
*G02B 27/10* (2006.01)

(52) U.S. Cl. .................. 359/456; 359/453; 359/457; 359/460; 359/619; 359/626

(58) Field of Classification Search ......... 359/453–458, 359/443, 618–619, 626, 460; 353/94
See application file for complete search history.

(56) References Cited

U.S. PATENT DOCUMENTS

| | | | | |
|---|---|---|---|---|
| 5,504,598 A | * | 4/1996 | Sprague et al. ............... 349/57 |
| 5,592,332 A | * | 1/1997 | Nishio et al. ................. 359/619 |
| 5,944,405 A | * | 8/1999 | Takeuchi et al. ............. 362/617 |
| 6,088,158 A | * | 7/2000 | Kimura ....................... 359/443 |
| 6,404,468 B1 | * | 6/2002 | Niwano et al. ................. 349/64 |
| 6,707,605 B2 | * | 3/2004 | Sekiguchi .................... 359/443 |
| 6,707,606 B2 | * | 3/2004 | Watanabe et al. ............ 359/452 |
| 2005/0146872 A1 | * | 7/2005 | Chang et al. ................. 362/246 |
| 2007/0177386 A1 | * | 8/2007 | Masaki et al. ................ 362/296 |

FOREIGN PATENT DOCUMENTS

| JP | 06-265732 | 9/1994 |
|---|---|---|
| JP | 10-333147 | 12/1998 |
| JP | 2001-021706 | 1/2001 |

* cited by examiner

*Primary Examiner*—Diane I. Lee
*Assistant Examiner*—Magda Cruz
(74) *Attorney, Agent, or Firm*—Burr & Brown

(57) ABSTRACT

A diffusing sheet, a surface light source unit, and a transmission type display that can attain uniform illumination so that the brightness of light on the display screen appears uniform regardless of the position from which the display screen is observed. The diffusing sheet includes, on its light-emerging side surface, a diffusion lens array having a plurality of unit lenses, each unit lens being in a shape equivalent to a part of an elliptic cylinder having an elliptical cross section. The surface light source unit includes the diffusing sheet and a convergent sheet 12 that has a plurality of unit lenses 121 having almost trapezoidal cross sections, formed on one surface thereof. It is possible to attain uniform illumination by diffusing light from cathode ray tubes in the surface light source unit, and, at the same time, to converge the light serving as backlight to enhance optical efficiency.

17 Claims, 28 Drawing Sheets

ANGLE OF INCIDENCE: 0°

ANGLE OF INCIDENCE:60°

DIFFUSING SHEET, SURFACE LIGHT SOURCE UNIT, AND TRANSMISSION TYPE DISPLAY

BACKGROUND OF THE INVENTION

1. Field of the Invention

The present invention relates to a display such as a liquid crystal display, and more particularly to a diffusing sheet for use in a surface light source unit that illuminates a transmission type liquid crystal display or the like from its rear, to a surface light source unit, and to a transmission type display using the diffusing sheet and the surface light source unit.

2. Background Art

A variety of surface light source units that are used to illuminate transmission type liquid crystal displays or the like from their rear have been proposed and put into practical use. Such surface light source units are broadly classified into the edge light type and the direct type according to the mode of conversion of a non-surface light source to a surface light source.

Of these, a surface light source unit of direct type is so constructed that light is introduced to the rear of a transmission type display member serving as a light bulb, such as an LCD panel, directly from cathode ray tubes arranged in parallel. In such a surface light source unit of direct type, the cathode ray tubes and the transmission type display member are properly spaced, and in this space are placed a diffusing sheet and a combination of two or more optical sheets capable of converging light.

Such a conventional surface light source unit of direct type is poor in the light-converging properties although the number of optical sheets needed for this unit is great. In order to solve this problem, the structure of the transmission type display member itself, such as an LCD panel, has been improved so that even light that is obliquely incident on the display can produce an image of excellent qualities. However, this conventional way of improvement causes reduction in optical efficiency, and also makes the transmission type display member such as an LCD panel complex in construction, which leads to increase in cost.

Another disadvantage of the conventional surface light source unit of direct type has been that the light intensity (luminance) on the display member tends to be non-uniform depending on the distance from the cathode ray tubes (i.e., whether a certain point on the display member is close to the cathode ray tube or to the space between the cathode ray tubes that are arranged in parallel).

A possible method of avoiding the above-described non-uniformity is to well space the cathode ray tubes and the transmission type display member such as an LCD panel. This method has been disadvantageous in that the display has an increased total thickness.

Another possible method of avoiding the above-described non-uniformity is to increase the degree to which the optical sheets or the like that are placed between the cathode ray tubes and the transmission type display member such as an LCD panel diffuse light, or to control the amount of light which the optical sheets transmit. This method has been disadvantageous in that it causes decrease in the amount of usable light.

More specifically, Japanese Laid-Open Patent Publications No. 119703/1993 and No. 242219/1999, for example, propose a method for maintaining the uniformity of light, in which a light-shielding member such as a lighting curtain or a light-shielding dot layer is provided in a surface light source unit. This method has been disadvantageous in that it causes decrease in the amount of usable light, like the above-described method.

Further, Japanese Laid-Open Patent Publication No. 347613/1994 proposes a method in which, in a surface light source unit, the diffusion of light in two directions is controlled by a sheet having lenticular lenses on both surfaces. Since the function of converging light cannot be sufficiently obtained by this method, the optical axis on every area on the face of the transmission type display member such as an LCD panel changes according to the position, relative to the cathode ray tubes, of the area. Thus, this method still has been at a disadvantage in that the brightness of light on the display screen varies depending on the position from which the display screen is observed.

SUMMARY OF THE INVENTION

The present invention has been accomplished in the light of the above-described problems in the prior art. An object of the present invention is therefore to provide a diffusing sheet, a surface light source unit, and a transmission type display that can attain uniform illumination so that the brightness of light on the display screen appears uniform regardless of the position from which the display screen is observed.

The present invention provides, as a first means of fulfilling the above-described object of the invention, a diffusing sheet that is used in a surface light source unit of direct type containing a light source member in which a plurality of light sources are arranged in parallel, and that diffuses light from the light sources in the light source member to make the light uniform, said diffusing sheet comprising, at least on its light-emerging side surface, a diffusion lens array having a plurality of unit lenses that allow light from the light sources in the light source member to be diffused and then to emerge from the unit lenses.

In the first means of fulfilling the object of the invention, it is preferable that the unit lenses that constitute the diffusion lens array be at least in one shape selected from shapes equivalent to a part of elliptic cylinders having elliptical cross sections and shapes equivalent to a part of spheroids having elliptical cross sections, and that the major axis of the elliptical cross section be perpendicular to the sheet face.

In the first means of fulfilling the object of the invention, it is also preferable that the semimajor axis of each unit lens in the diffusion lens array be from 1.5 to 3 times the semiminor axis of the same.

Further, in the first means of fulfilling the object of the invention, it is preferable that each unit lens in the diffusion lens array has a width W. a height H, and a refractive index N that fulfill the relationship:

$$\arcsin(1/N) < \arctan(1/((2H/W)-0.1)).$$

Furthermore, in the first means of fulfilling the object of the invention, it is preferable that between each two adjacent unit lenses in the diffusion lens array be provided a part that is at least in one form selected from flats, concavities, and fine irregularities.

Furthermore, in the first means of fulfilling the object of the invention, it is preferable that the diffusing sheet has, on the light-entering side, a plane of incidence with fine irregularities having a light-diffusing action. In this case, it is preferable that the diffusing sheet has, in addition to a light-diffusing action given by the diffusion lens array, a non-directional light-diffusing action that makes a half-angle of diffusion 70° or less, owing to the fine irregularities on the plane of incidence. In this Specification, the "half-angle of diffusion"

means the angle of diffusion at which the value of brightness (luminance) is a half of the maximum brightness.

Furthermore, in the first means of fulfilling the object of the invention, it is preferable that at least a part of the diffusing sheet contains light-diffusing particles. In this case, it is preferable that the diffusing sheet has, in addition to a light-diffusing action given by the diffusion lens array, a non-directional light-diffusing action that makes a half-angle of diffusion 70° or less, owing to the light-diffusing particles.

Furthermore, in the first means of fulfilling the object of the invention, it is preferable that the diffusing sheet be composed of two or more layers having different rates of moisture absorption, and that, of the two or more layers, the layer situated on the light-entering side has a rate of moisture absorption higher than that of the layer situated on the light-emerging side on which the diffusion lens array is formed.

The present invention provides, as a second means of fulfilling the object of the invention, a surface light source unit that illuminates a transmission type display member from its rear, comprising: a light source member in which a plurality of light sources are arranged in parallel; and a diffusing sheet according to the above-described first means of fulfilling the object of the invention, that diffuses light from the light sources in the light source member to make the light uniform.

In the second means of fulfilling the object of the invention, it is preferable that the diffusing sheet be placed next to the light source member so that light from the light source member directly enters the diffusing sheet.

The present invention provides, as a third means of fulfilling the object of the invention, a surface light source unit that illuminates a transmission type display member from its rear, comprising: a light source member in which a plurality of light sources are arranged in parallel; and a diffusing sheet member that diffuses light from the light sources in the light source member to make the light uniform, the diffusing sheet member being composed of two or more diffusing sheets that are either the same or different, each diffusing sheet in the diffusing member having, at least on its light-emerging side surface, a diffusion lens array having a plurality of unit lenses that allow light from the light sources in the light source member to be diffused and then to emerge from the unit lenses.

In the third means of fulfilling the object of the invention, it is preferable that the unit lenses that constitute the diffusion lens array formed on each diffusing sheet in the diffusing sheet member are in either the same shape or different shapes, each shape being equivalent to a part of an elliptic cylinder having an elliptical cross section, and that the major axis of the elliptical cross section be perpendicular to the sheet face.

Further, in the third means of fulfilling the object of the invention, it is preferable that the two or more diffusing sheets in the diffusing sheet member be arranged so that the directions in which the diffusion lens arrays on the diffusing sheets exert their light-diffusing actions are perpendicular to each other.

The present invention provides, as a fourth means of fulfilling the object of the invention, a transmission type display comprising: a transmission type display member; and a surface light source unit according to the above-described second or third means of fulfilling the object of the invention, that illuminates the transmission type display member from its rear.

The present invention can show the following actions and effects:

(1) In the surface light source unit of direct type comprising a light source member in which a plurality of light sources are arranged in parallel, the diffusing sheet having, at least on its light-emerging side surface, the diffusion lens array is incorporated, so that uniform illumination can be attained without reducing optical efficiency.

(2) If the shape of each unit lens in the diffusion lens array is made equivalent to a part of an elliptic cylinder or spheroid whose major axis is perpendicular to the sheet face, the diffusing properties of the unit lenses can be freely controlled as compared with cylindrical or spherical unit lenses.

(3) If the semimajor axis of each unit lens in the diffusion lens array is made 1.5 to 3 times the semiminor axis of the same, there can be obtained a diffusing sheet useful in attaining uniform illumination without reducing optical efficiency.

(4) If each unit lens in the diffusion lens array is made to have a width W, a height H, and a refractive index N that fulfill the relationship: $\arcsin(1/N) < \arctan(1/((2H/W)-0.1))$, the luminance on the display screen appears uniform even when the display screen is observed from oblique directions, and the optical efficiency becomes higher.

(5) If between each two adjacent unit lenses in the diffusion lens array is provided a part that is in one form selected from flats, concavities, and fine irregularities, the transmittance for light incident at an angle of approximately 0°, which is insufficient when the diffusion lens array has only the unit lenses without such parts, is increased, and, at the same time, there can be obtained the effect of properly eliminating illumination non-uniformity and the effect of correcting and focusing the direction in which light emerges. Further, a mold that is used for forming such a diffusing sheet is to have increased strength, so that it is possible to prevent deformation of the mold that can occur in the production of the mold.

(6) If a plane of incidence with fine irregularities that have a light-diffusing action is provided on the light-entering side of the diffusing sheet, the diffusing properties are further enhanced, and a non-directional light-diffusing action can be obtained.

(7) If light-diffusing particles are incorporated at least in a part of the diffusing sheet, the diffusing properties are further enhanced, and a non-directional light-diffusing action can be obtained.

(8) If the diffusing sheet is made to have, in addition to a light-diffusing action given by the diffusion lens array, a non-directional light-diffusing action that makes a half-angle of diffusion 70° or less, owing to the fine irregularities on the plane of incidence of the diffusing sheet or to the light-diffusing particles, it is possible to obtain the effect of reducing illumination non-uniformity without increasing the number of sheets required.

(9) If the diffusing sheet is composed of two or more layers having different rates of moisture absorption, and, of these two or more layers, the layer situated on the light-entering side is made to have a rate of moisture absorption higher than that of the layer situated on the light-emerging side on which the diffusion lens array is formed, even when the diffusing dries from the light source side due to heat generated by the cathode ray tubes, it does not curve outward to the light-emerging side. The diffusing sheet is therefore prevented from partly coming into close contact with the other optical sheet to cause illumination non-uniformity.

(10) Since the diffusing sheet member is composed of two or more diffusing sheets of either the same type or of different types, it can show the enhanced diffusing properties and the effect of making the luminance on a display screen uniform.

(11) The two or more diffusing sheets are arranged in such a manner that the directions in which the diffusion lens arrays on the diffusing sheets exert their light-diffusing actions become perpendicular to each other. It is therefore possible to independently control the viewing angles in two directions that are at right angles. It is also possible to make full use of light, so that the brightness of the illumination light becomes higher.

DETAILED DESCRIPTION OF PREFERRED EMBODIMENTS

Embodiments of the present invention will be described hereinafter with reference to the accompanying drawings.

Embodiment 1

First, a transmission type display according to the first embodiment of the present invention will be described with reference to FIGS. 1 to 17.

Figure 1:
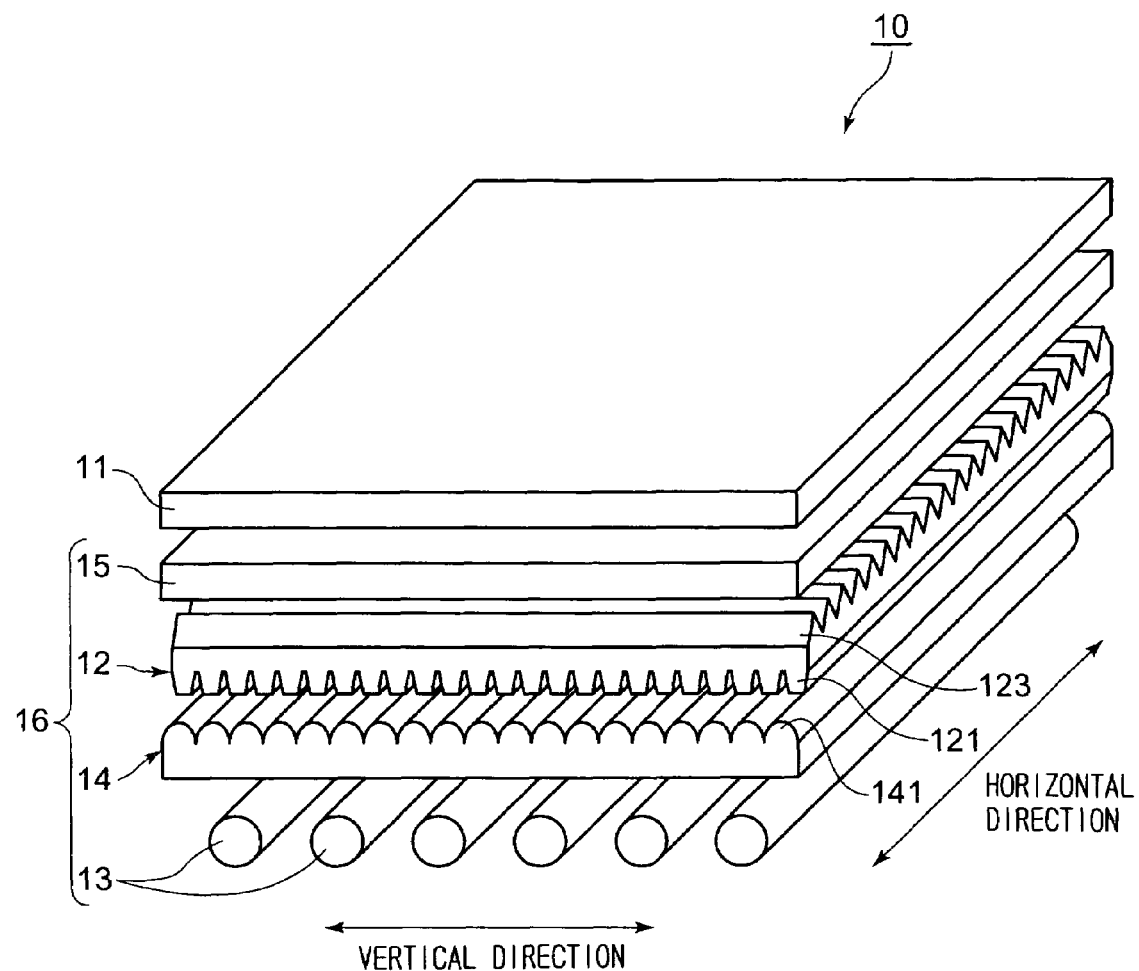
FIG. 1 is a perspective view of a transmission type display according to the first embodiment of the present invention.

As shown in FIG. 1, a transmission type display 10 according to the first embodiment of the present invention is a liquid crystal display of transmission type, in which liquid crystal display elements control transmission/non-transmission of light to display image information, and comprises an LCD panel (transmission type display member) 11 and a surface light source unit 16 that illuminates the LCD panel from its rear. The surface light source unit 16 comprises a convergent sheet 12, cathode ray tubes 13, a diffusing sheet 14, and a reflective polarizer 15, and illuminates, from the rear, the LCD panel 11 on which an image pattern has been produced according to image information, thereby forming an image on the LCD panel 11. Those figures, including FIG. 1, to which reference is made in the following description are diagrammatic views, and the dimensions and the shapes of the parts shown in the figures are exaggerated in order to facilitate understanding.

The LCD panel 11 is a light bulb composed of liquid crystal display elements of so-called transmission type. In the first embodiment of the present invention, the LCD panel 11 is 30 inches in size and is so constructed that it can attain 800×600 dot matrix display.

The surface light source unit 16 is of direct type in which a plurality of cathode ray tubes 13 is arranged in parallel. The cathode ray tubes 13 are line light sources that constitute a light source member serving as a backlight. In the first embodiment of the present invention, 6 cathode ray tubes are arranged in parallel, equally spaced about 75 mm apart. Further, in the first embodiment of the invention, these cathode ray tubes 13 are so arranged that their longer direction agrees with the horizontal direction of the LCD panel 11 and that the direction in which they are arranged agrees with the vertical direction of the LCD panel 11, as shown in FIG. 1.

A reflector, not shown in the figure, is placed on the rear of the cathode ray tubes 13. The reflector so placed makes the luminous intensity of light incident on the screen of the LCD panel 11 nearly uniform.

Furthermore, between the cathode ray tubes 13 and the convergent sheet 12 is placed the diffusing sheet 14. When the diffusing sheet 14 is placed, the luminance on the display screen becomes almost uniform regardless of the position on the display screen (that is, regardless of whether the position is close to the cathode ray tube 13 or to the space between the cathode ray tubes 13 that are arranged in parallel), and light is to reach the convergent sheet 12 under such a state.

It is preferable that the diffusing sheet 14 be placed next to the cathode ray tubes 13 constituting a light source member so that light from the cathode ray tubes 13 directly enters the diffusing sheet 14. By so arranging the diffusing sheet 14, it is possible to attain uniform illumination so that the luminance on the display screen becomes uniform regardless of the position on the display screen, and to effectively use light to enhance luminance as a whole.

The diffusing sheet 14 to be incorporated in the surface light source unit 16 will be described hereinafter in detail.

Figure 2:
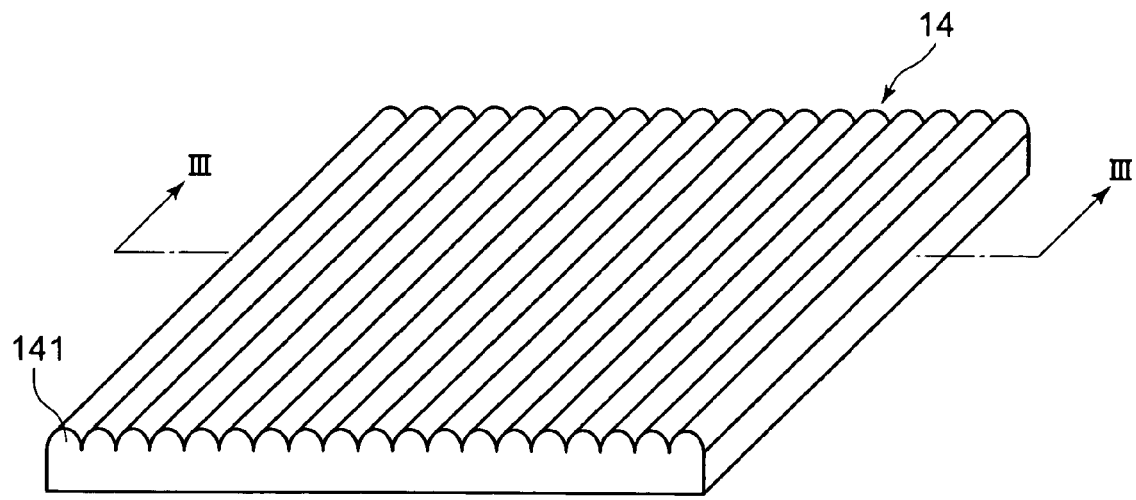
FIG. 2 is a perspective view of a diffusing sheet contained in the surface light source unit in the transmission type display shown in FIG. 1.

As shown in FIGS. 1 and 2, the diffusing sheet 14 is a sheet for diffusing light from the cathode ray tubes 13 to make the light uniform and has, on its light-emerging side surface, a diffusion lens array 141.

The diffusion lens array 141 diffuses light from the cathodes ray tubes 13 and allows the diffused light to emerge from the array. This diffusion lens array 141 has a plurality of unit lenses whose shape is equivalent to a part of continuous elliptic cylinders having elliptical cross sections. A large number of these unit lenses are arranged in parallel, and the direction in which they are arranged agrees with the direction in which the cathode ray tubes 13 are arranged (see FIG. 1). Moreover, these unit lenses constitute a lenticular lens as a whole.

Figure 3:
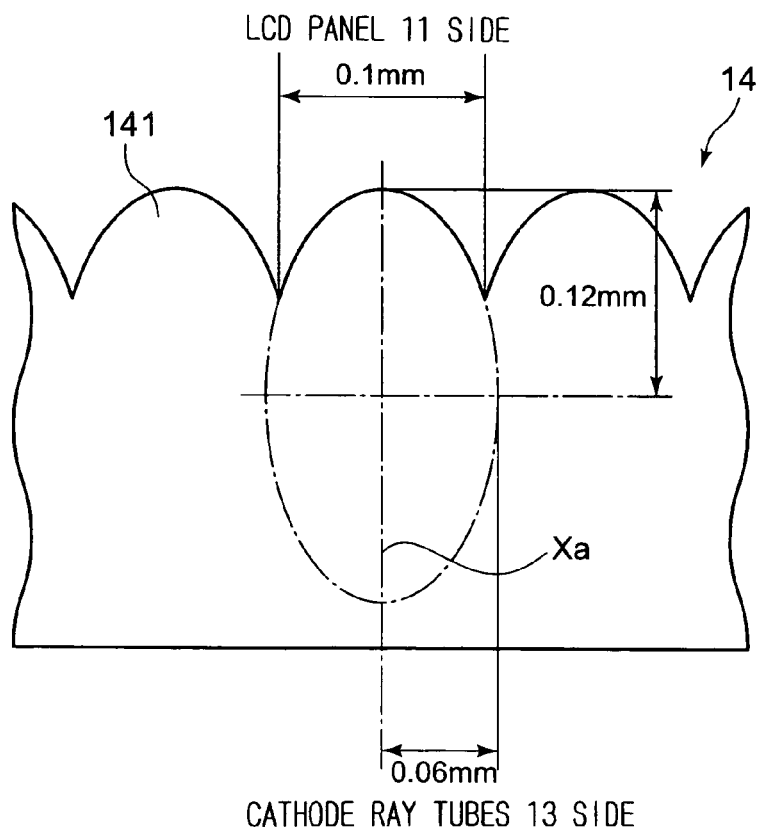
FIG. 3 is an enlarged sectional view of the diffusing sheet, taken along line III-III of FIG. 2.

Each unit lens in the diffusion lens array 141 has an elliptical cross section as is shown in FIG. 3, and the major axis Xa of the ellipse is perpendicular to the sheet face. Preferably, the semimajor axis of the ellipse is from 1.5 to 3 times the semiminor axis of the ellipse. By so making the unit lenses, it is possible to effectively prevent illumination non-uniformity on the display screen that occurs depending on whether a point on the display screen is close to the cathode ray tubes or not. In the first embodiment of the present invention, as exemplarily shown in FIG. 3, the thickness of the diffusing sheet 14 is 2 mm; the shape of the cross section of each unit lens in the diffusion lens array 141 on the diffuser 14 is equivalent to a part of an ellipse with a semimajor axis of 0.12 mm and a semiminor axis of 0.06 mm (an ellipse whose major axis is perpendicular to the sheet face of the diffusing sheet 14); and the unit lenses are arranged with a pitch of 0.1 mm. In this case, the ratio of the semimajor axis to the semiminor axis (semimajor axis/semiminor axis) is 2 times.

The preferred range (1.5 to 3 times) of the ratio of the semimajor axis to the semiminor axis (semimajor axis/semiminor axis) of the elliptical cross section of each unit lens in the diffusion lens array 141 can be experimentally obtained in the following manner.

Five diffusing sheets having five different diffusion lens arrays that are different in the ratio of the semimajor axis to the semiminor axis of the elliptical cross section of each unit lens were prepared. Each diffusing sheet prepared was used as the diffusing sheet 14 in the surface light source unit 16 of the construction shown in FIG. 1, and illumination non-uniformity was observed. The five different diffusing sheets with different ratios of the semimajor axis to the semiminor axis (semimajor axis/semiminor axis) of the elliptical cross section were compared in terms of the illumination non-uniformity. The results are shown in Table 1 below.

With the surface light source unit 16 of the construction shown in FIG. 1, it is not easy to check the illumination non-uniformity because the convergent sheet 12 is present. Therefore, experiments were conducted by using a surface light source unit in which the diffusing sheet 14 and the reflective polarizer 15 were laminated without the convergent sheet 12 and a surface light source unit in which another diffusing sheet was newly placed between the above sheets. The diffusing sheet newly added was an opaque diffuser with a transmittance of 60% and was placed between the diffusing sheet 14 and the reflective polarizer 15. In Table 1, the mark "○" denotes that non-uniformity is not observed; the mark "Δ" denotes that non-uniformity is slightly observed; and the mark "x" denotes that non-uniformity is clearly observed.

TABLE 1

| Semimajor Axis/ Semiminor Axis | Diffusing sheet 14 + Reflective Polarizer 15 | Diffusing sheet 14 + Opaque Diffuser + Reflective Polarizer 15 |
| --- | --- | --- |
| 1 time | x | Δ |
| 1.5 times | Δ | ○ |
| 2 times | ○ | ○ |
| 3 times | Δ | ○ |
| 5 times | x | Δ |

As can be known from the above Table 1, for the ratio of the semimajor axis to the semiminor axis (semimajor axis/semiminor axis) of the elliptical cross section of each unit lens in the diffusion lens array 141, two times is optimum to prevention of illumination non-uniformity. In the case where another diffusing element (opaque diffuser) is added, illumination non-uniformity is avoidable when the above ratio is from 1.5 to 3 times.

When the ratio of the semimajor axis to the semiminor axis (semimajor axis/semiminor axis) of the elliptical cross section of each unit lens in the diffusion lens array 141 was small (1 time, etc.), those parts of the display screen that were close to the cathode ray tubes 13 tended to be bright, while when this ratio was great (5 times, etc.), those parts of the display screen that were close to the spaces between the cathode ray tubes 13 arranged in parallel tended to be bright.

In the diffusing sheet 14 according to the first embodiment of the present invention, exemplarily shown in FIG. 3, the ratio of the lens pitch to the semiminor axis of the elliptical cross section of each unit lens in the diffusion lens array 141 (pitch/semiminor axis) is 0.1/0.06=1.67. When this pitch ratio (pitch/semiminor axis) is excessively small (when the semiminor axis is excessively great), the surface of each unit lens becomes nearly equal to a plane, and the lens effects of the diffusion lens array 141 cannot be fully obtained. On the contrary, when the pitch ratio (pitch/semiminor axis) is excessively great (when the semiminor axis is excessively small), those portions protruding from the surface of a mold that is used for forming the diffusion lens array 141 become excessively sharp. For this reason, it is preferable that the pitch ratio (pitch/semiminor axis) be approximately 0.5 to 1.8.

Next, the optical action of the diffusing sheet 14 of the above-described construction will be described with reference to FIGS. 4 to 7.

Figure 4:
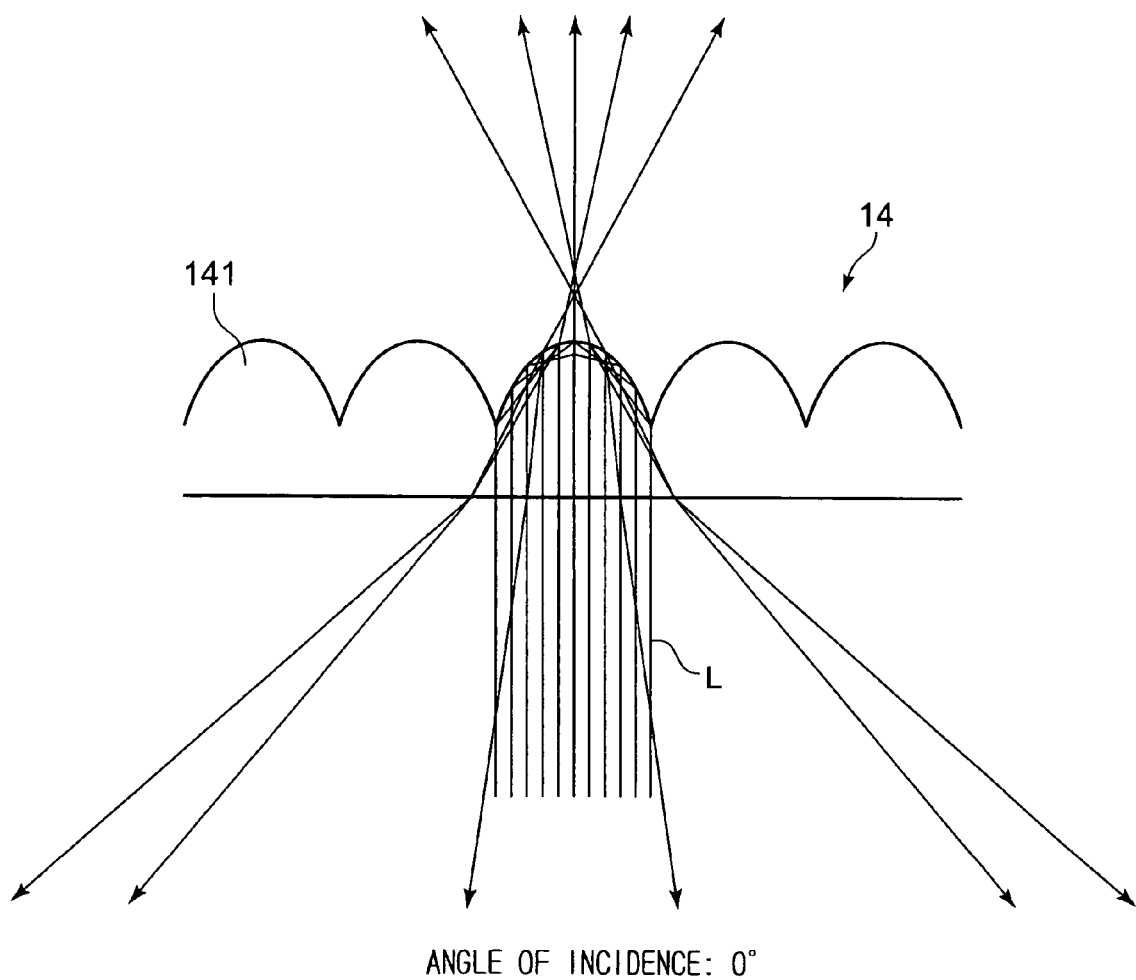
FIG. 4 is a view showing paths which light incident on the diffusing sheet shown in FIG. 2 at an angle of 0° traces.

FIG. 4 is a view showing paths which light incident on the diffusing sheet 14 at an angle of 0° traces. In this case, of the light L that has entered the diffusing sheet 14 at an angle of incidence of 0° from the light source side (indicated by 11 light rays in FIG. 4), some (5 light rays in FIG. 4) emerge from the diffusing sheet 14 toward the observation side, and the other (6 light rays in FIG. 4) return to the light source side, as shown in FIG. 4.

Figure 5:
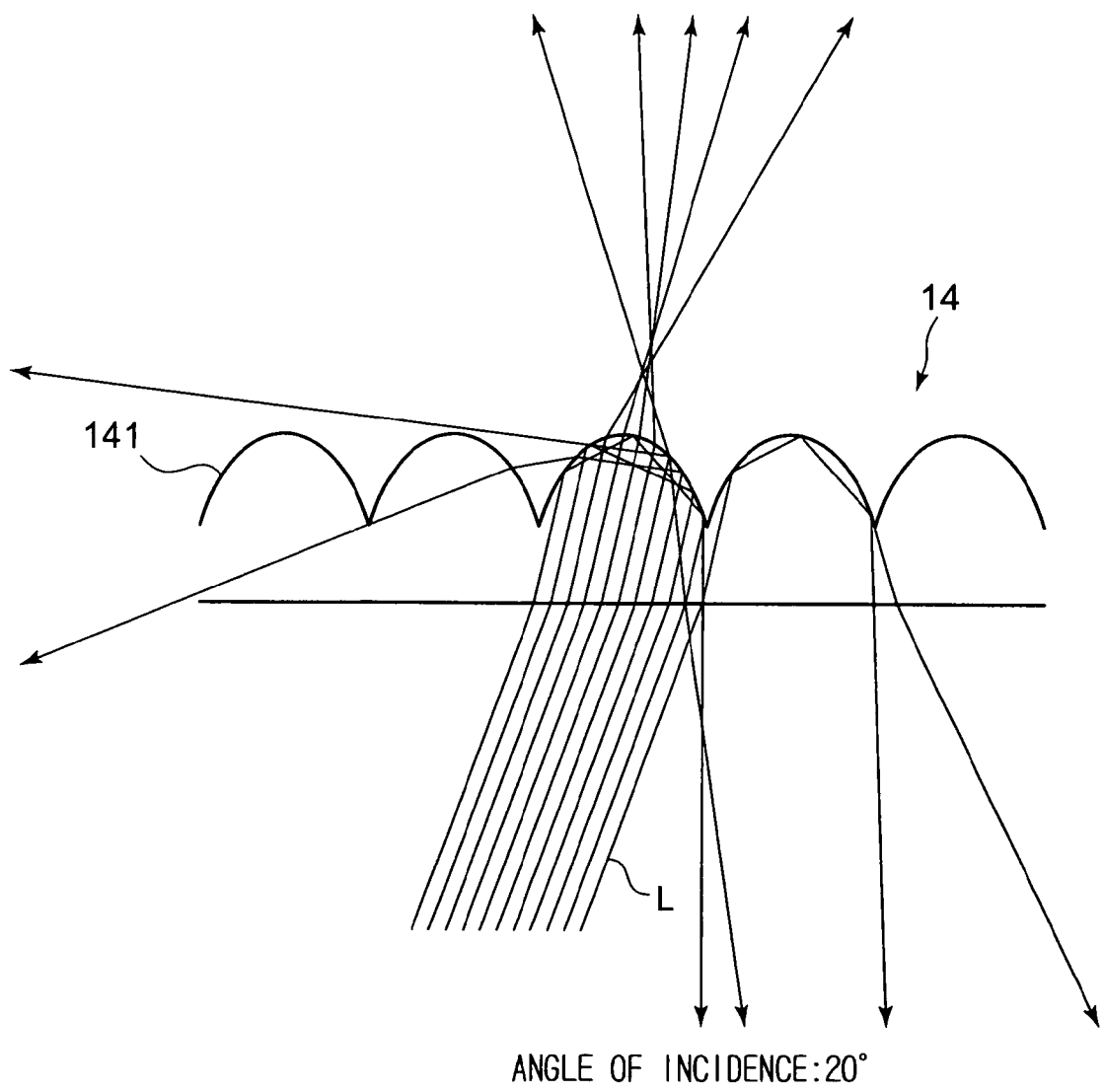
FIG. 5 is a view showing paths which light incident on the diffusing sheet shown in FIG. 2 at an angle of 20° traces.

FIG. 5 is a view showing paths which light incident on the diffusing sheet 14 at an angle of 20° traces. In this case, of the light L that has entered the diffusing sheet 14 at an angle of incidence of 20° from the light source side (indicated by 11 light rays in FIG. 5), some (6 light rays in FIG. 5) emerge from the diffusing sheet 14 toward the observation side, and the other (5 light rays in FIG. 5) return to the light source side, as shown in FIG. 5.

Figure 6:
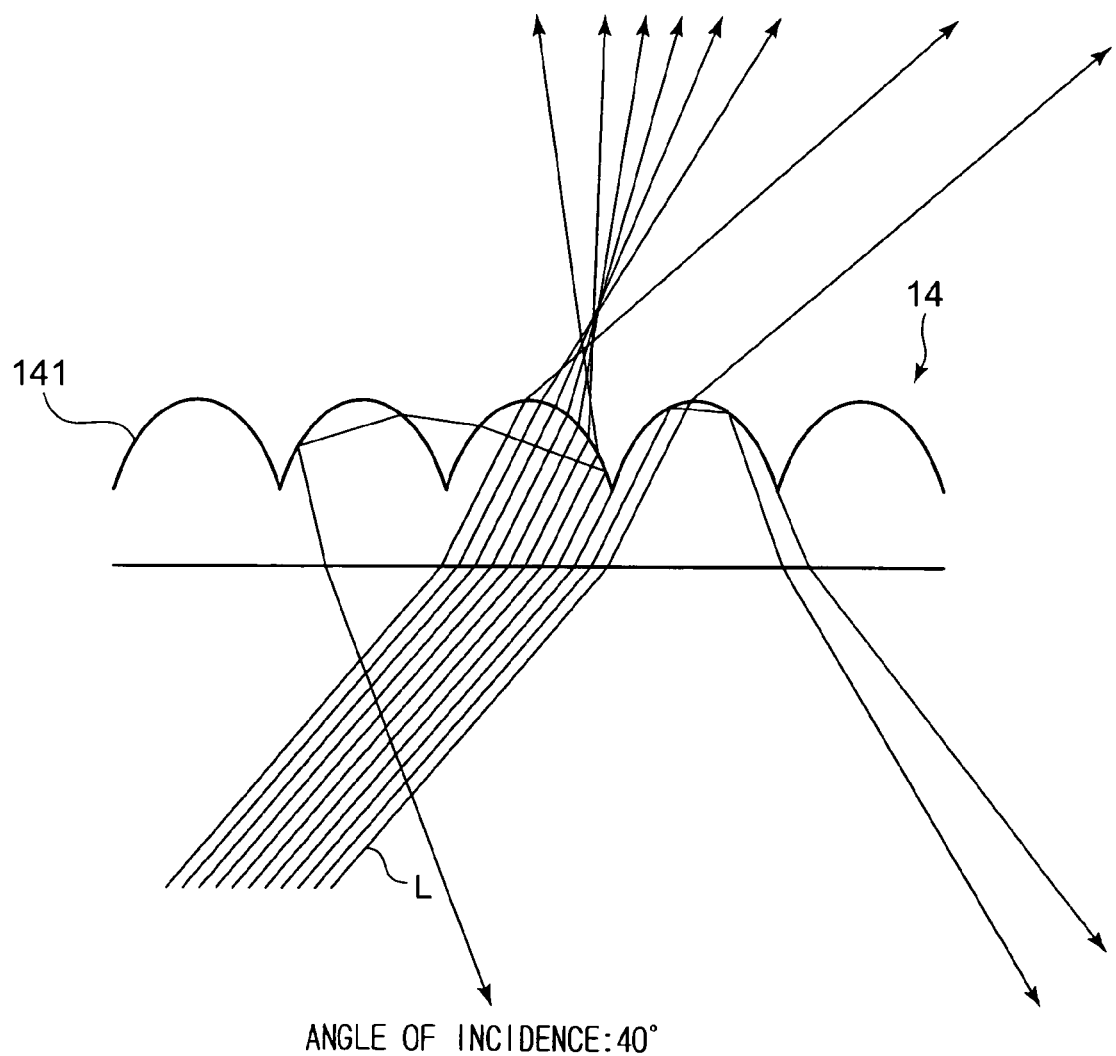
FIG. 6 is a view showing paths which light incident on the diffusing sheet shown in FIG. 2 at an angle of 40° traces.

FIG. 6 is a view showing paths which light incident on the diffusing sheet 14 at an angle of 40° traces. In this case, of the light L that has entered the diffusing sheet 14 at an angle of incidence of 40° from the light source side (indicated by 11 light rays in FIG. 6), some (8 light rays in FIG. 6) emerge from the diffusing sheet 14 toward the observation side, and the other (3 light rays in FIG. 6) return to the light source side, as shown in FIG. 6.

Figure 7:
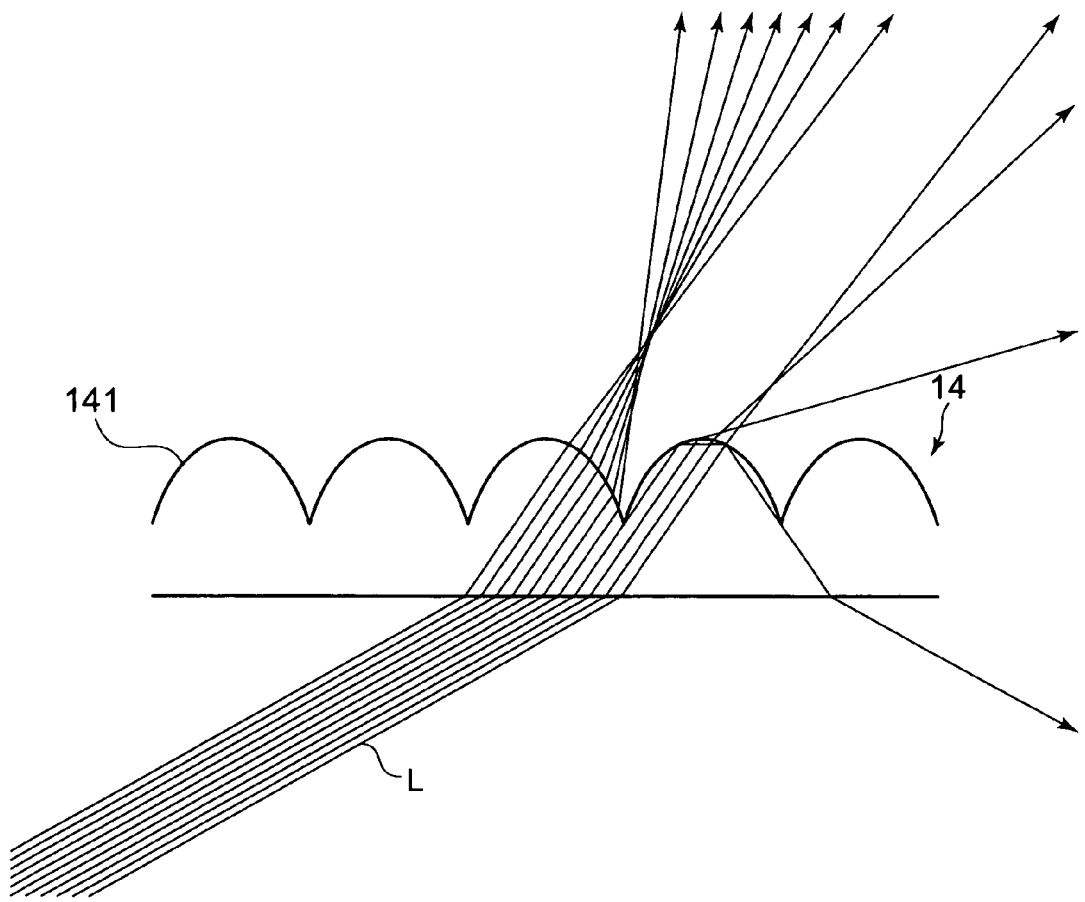
FIG. 7 is a view showing paths which light incident on the diffusing sheet shown in FIG. 2 at an angle of 60° traces.

FIG. 7 is a view showing paths which light incident on the diffusing sheet 14 at an angle of 60° traces. In this case, of the light L that has entered the diffusing sheet 14 at an angle of incidence of 60° from the light source side (indicated by 11 light rays in FIG. 7), some (10 light rays in FIG. 7) emerge from the diffusing sheet 14 toward the observation side, and the other (1 light ray in FIG. 7) return to the light source side, as shown in FIG. 7.

As is clear from these FIGS. 4 to 7, most of the light that has entered the diffusing sheet 14 at small angles return to the light source side, while most of the light that has entered the diffusing sheet 14 at large angles emerge from the diffusing sheet 14 toward the observation side without returning to the light source side. Since the diffusing sheet 14 has such an optical action, light emerging from the cathode ray tube 13 and entering the diffusing sheet 14 at a point close to the cathode ray tube 13 returns to the cathode ray tubes side, that is, the light source side, in a high proportion because the angle at which the light has entered the diffusing sheet 14 is small. On the other hand, as the distance between the point on the diffuser 14 on which the illumination light is incident and the cathode ray tube 13 increases (as the point on which the light is incident gets close to the space between the cathode ray tubes 13 that are arranged in parallel), the proportion of the light rays that emerge from the diffusing sheet 14 toward the observation side increases. For this reason, the luminous intensity of the light that finally emerges from the diffusing sheet 14 becomes uniform.

Next, a process of producing the diffusing sheet 14 of the above-described construction will be described.

In the production of the diffusing sheet 14, a lens film 141a with a surface in the shape of the diffusion lens array 141 is firstly prepared.

Figure 29A:
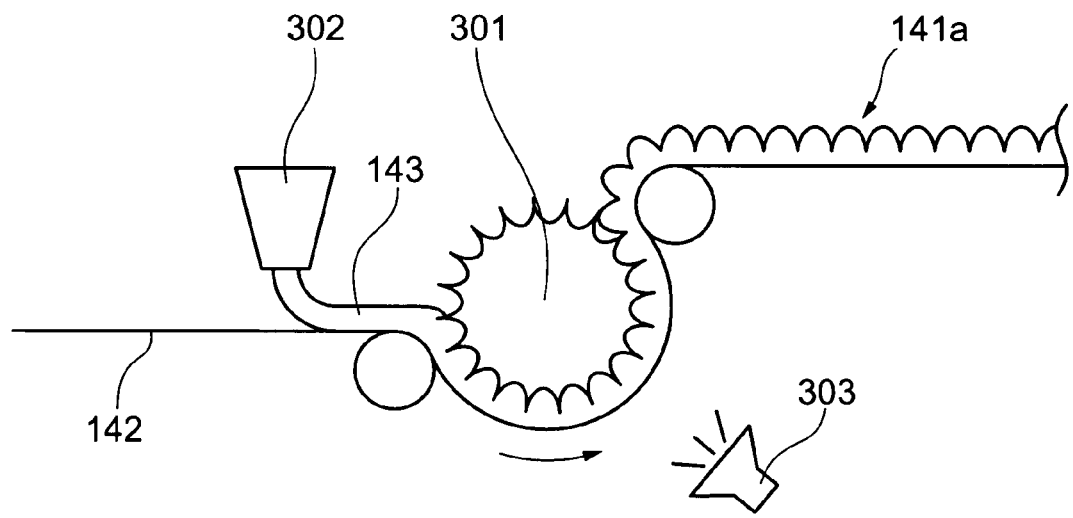
FIGS. 29A and 29B are diagrammatic views illustrating the processes of producing a lens film, a constituent of the diffusing sheets according to the first to fourth embodiments of the present invention.
Figure 29B:
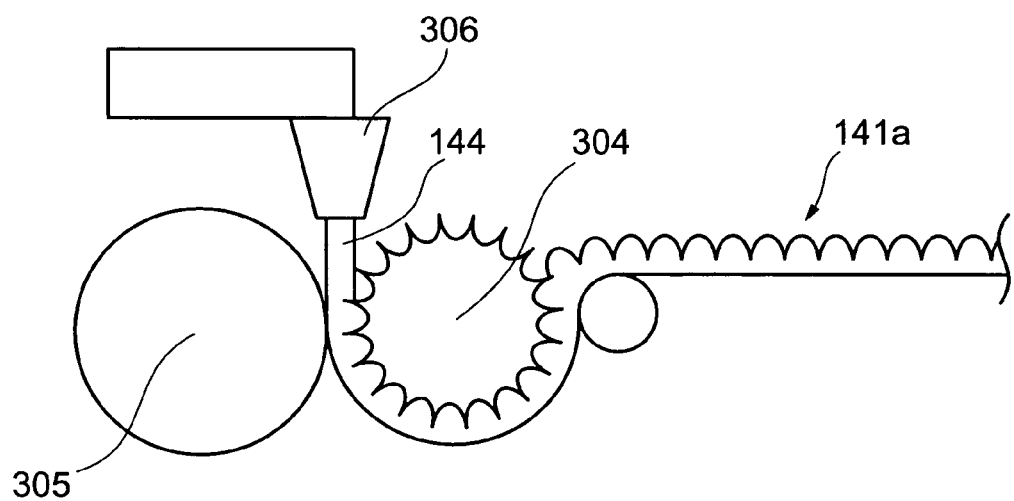

FIGS. 29A and 29B are views illustrating two processes of producing the lens film 141a. Although these figures, to make it easy to understand, exemplarily show the case where the longer direction of the unit lenses on the lens film 141a that are formed by a mold 301, 304 is the same as the direction in which the revolving shaft of the mold 301, 304 extends, the longer direction of the unit lenses on the lens film 141a may be made the same as the circumferential direction of the mold 301, 304. It is easy to conduct molding in the latter case; the latter is therefore more preferable than the former in this sense. In addition, these FIGS. 29A and 29B, and FIGS. 30A, 30B and 31 that will be described later are diagrammatic views illustrating production processes, and the layers shown in these figures are dimensionally exaggerated.

FIG. 29A is a view illustrating a process, called UV molding, for producing a lens film 141a. As shown in FIG. 29A, a UV curing resin 143 fed from a resin feeder 302 is firstly applied to a base film 142 made from polycarbonate. The base film 142 is wound around a female mold 301 for forming the diffusion lens array 141, with the UV curing resin 143 side facing to the molding surface. Ultraviolet light from a UV light source 303 is then applied to cure the UV curing resin 143, thereby obtaining a lens film 141a whose surface is in the shape of the diffusion lens array 141.

FIG. 29B is a view illustrating a process, called extrusion molding, for producing a lens film 141a. As shown in FIG. 29B, an MS (methacryl-styrene) resin 144 in the molten state is fed from a resin feeder 306 into between a female mold 304 for forming the diffusion lens array 141 and a roller 305 and is cooled, thereby obtaining a lens film 141a whose surface is in the shape of the diffusion lens array 141.

The above-obtained lens film 141a itself is poor in strength and cannot fully remain flat. In order to increase the strength of the diffusing sheet 14 to make the diffusing sheet 14 highly flat, the lens film 141a and a transparent substrate layer are made into one body. Methods for making the lens film 141a and a substrate layer into one body includes a method in which the lens film is laminated to a substrate layer, and a method in which the lens film is thermally laminated to a substrate layer when the substrate layer is produced.

Figure 30A:
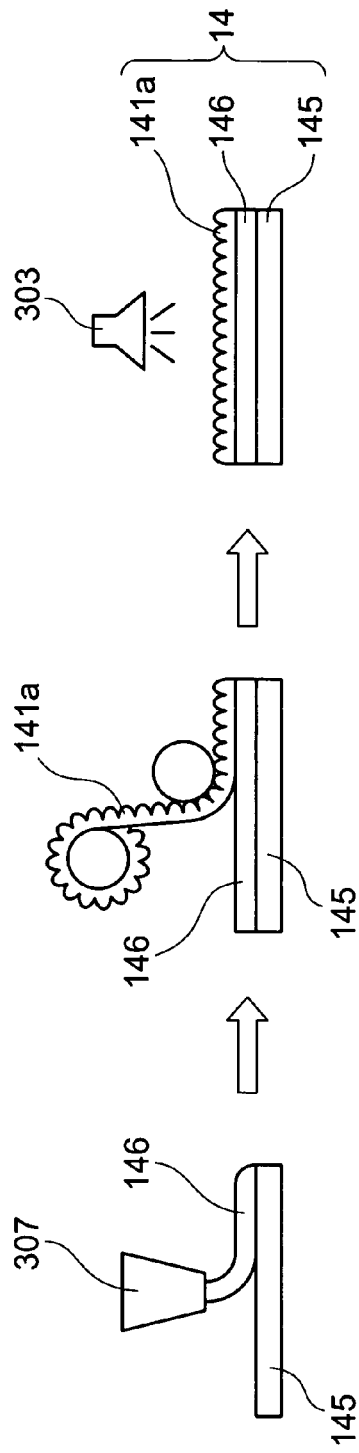
FIGS. 30A and 30B are views illustrating the methods for making a lens film and a substrate layer into one body, where the lens film produced by the process shown in FIG. 29A or 29B is laminated to a substrate layer.
Figure 30B:
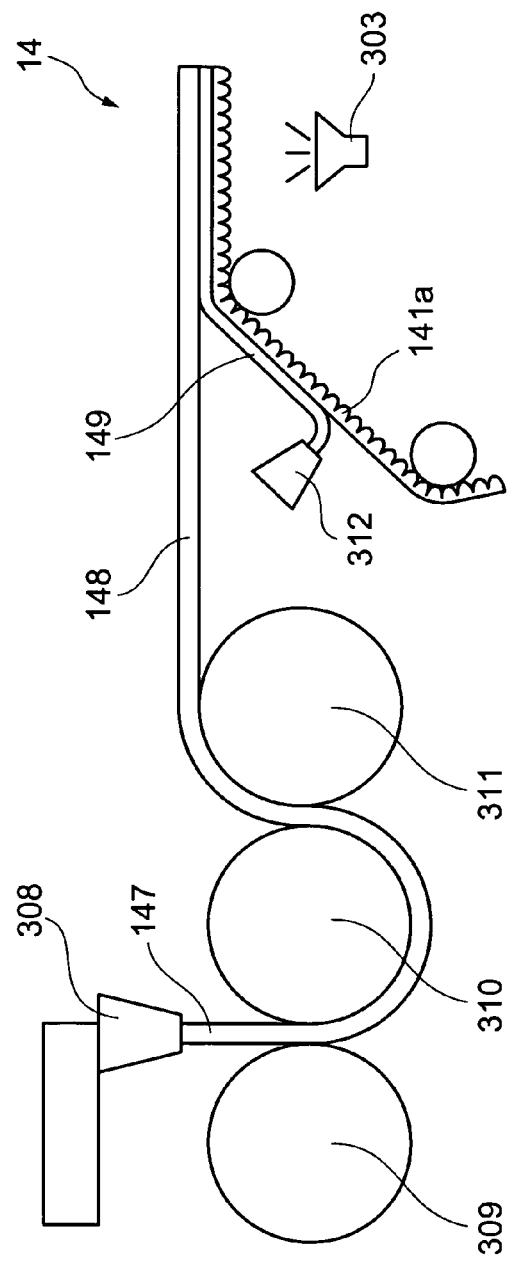

FIGS. 30A and 30B are views showing two methods for making the lens film 141a and a substrate layer into one body by laminating the former to the latter.

FIG. 30A is a view illustrating a method of laminating the lens film 141a to a substrate layer 145 that has been prepared in sheet form. As shown in FIG. 30A, a substrate layer 145 in sheet form in the predetermined dimensions is firstly prepared, and a UV curing resin 146 fed from a resin feeder 307 is applied to this substrate layer 145. The lens film 141a is placed on this UV curing resin 146 applied, and ultraviolet light from a UV light source 303 is applied to cure the UV curing resin 146, thereby obtaining a diffusing sheet 14 composed of a laminate of the lens film 141a and the substrate layer 145.

FIG. 30B is a view illustrating a method of continuously laminating the lens film 141a to a substrate layer on the downstream side, when the substrate layer is made by extrusion molding. As shown in FIG. 30B, an MS resin 147 in the molten state is fed from a resin feeder 308 into between extrusion rollers 309 and 310, thereby obtaining a substrate layer 148. Simultaneously with the production of the substrate layer 148, a UV curing resin 149 fed from a resin feeder 312 is applied to the non-lens-formed surface of the lens film 141a. The lens film 141a is laminated to the substrate layer 148 with the UV curing resin 149 side of the former facing to one surface of the latter, right after the substrate layer 148 has passed through the roller 311 and its formation has been completed, and ultraviolet light from a UV light source 303 is applied to cure the UV curing resin 149, thereby obtaining a diffusing sheet 14 composed of a laminate of the lens film 141a and the substrate layer 148.

Figure 31:
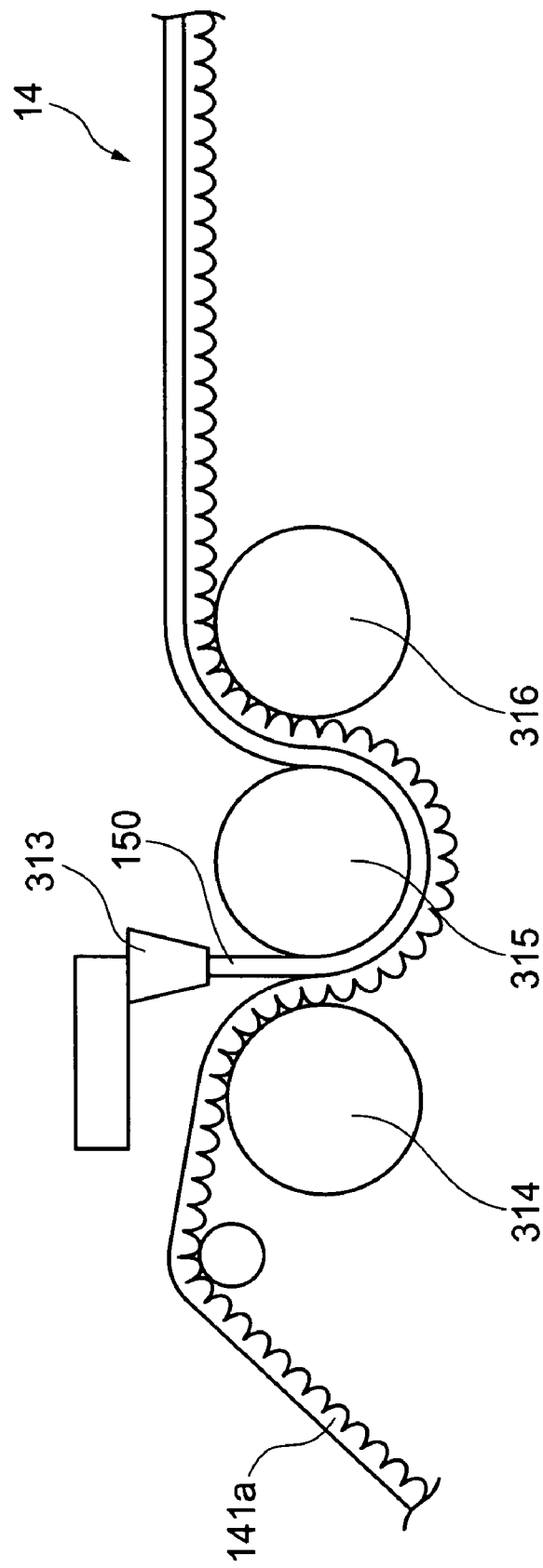
FIG. 31 is a view illustrating the method for making a lens film and a substrate layer into one body, where the lens film produced by the process shown in FIG. 29A or 29B is thermally laminated to a substrate layer when the substrate layer is produced.

FIG. 31 is a view illustrating a method of thermally laminating the lens film 141a to a substrate layer when the substrate layer is produced.

As shown in FIG. 31, the lens film 141a is firstly fed into between extrusion rollers 314, 315 together with an MS resin 150 in the molten state, fed from a resin feeder 313, with the non-lens-formed surface of the lens film 141a in contact with the MS resin 150. Thus, while extrusion molding the substrate layer, the lens film 141a and the substrate layer are thermally laminated by means of the extrusion rollers 314, 315, thereby obtaining a diffusing sheet 14.

By the use of the above-described methods for production, a diffusing sheet 14 having high strength, excellent in flatness, can be stably produced at low cost.

Returning now to FIG. 1, the convergent sheet 12 for use in the surface light source unit 16 will be described.

Figure 8:
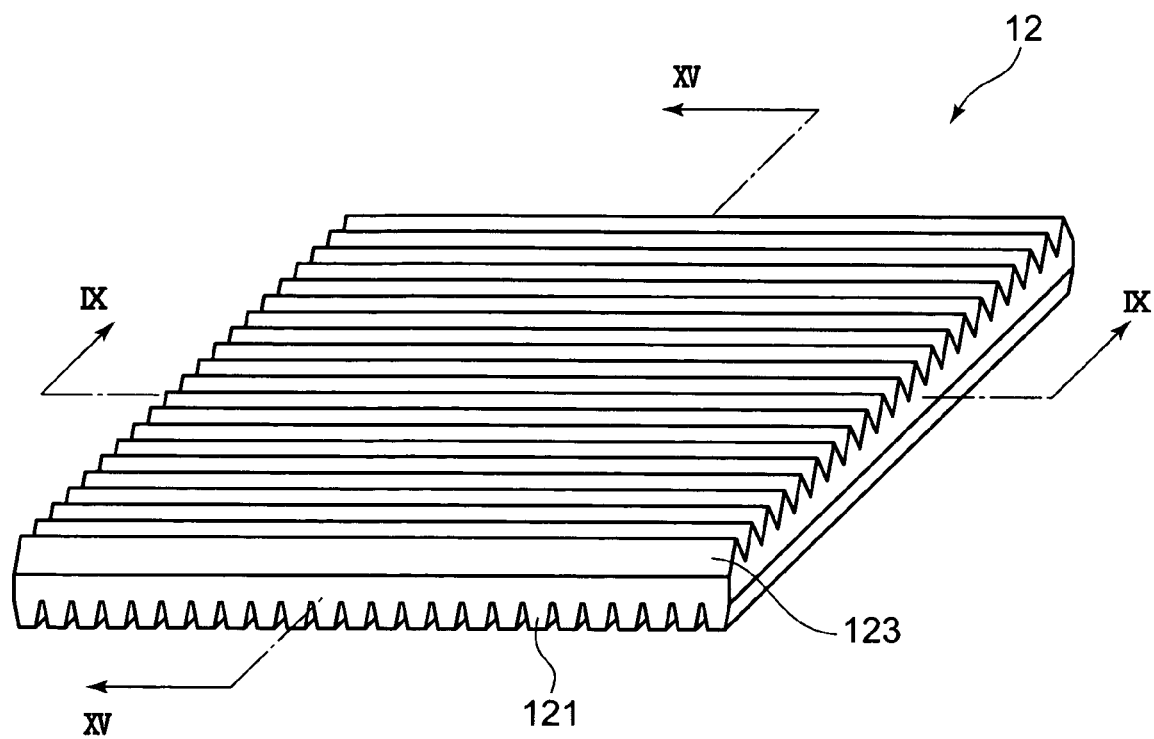
FIG. 8 is a perspective view of a convergent sheet contained in the surface light source unit in the transmission type display shown in FIG. 1.

As shown in FIGS. 1 and 8, the convergent sheet 12 is for converging light that has been diffused by the diffusing sheet 14 after emerging from the cathode ray tubes 13, and allowing the converged light to emerge from the sheet. The convergent sheet 12 is placed between the diffusing sheet 14 and the LCD panel 11. In the first embodiment of the present invention, the convergent sheet 12 is formed by the use of a resin with any refractive index (e.g., n=1.55).

On the light-entering side (the cathode ray tubes 13 side) surface of the convergent sheet 12, a plurality of light-entering-side unit lenses 121 whose cross sections taken in the direction perpendicular to the sheet face are nearly trapezoidal are arranged in the direction of the sheet face. These light-entering-side unit lenses 121 extend in the direction perpendicular to the direction in which they are arranged, with their cross sections maintained as they are. Namely, the convergent sheet 12 is arranged so that the direction in which the light-entering-side unit lenses 121 extend agrees with the longer direction of the cathode ray tubes 13.

Further, a convergent lens array 123 is formed on the light-emerging side (the LCD panel side 11) surface of the convergent sheet 12. In the convergent lens array 123, a plurality of unit prisms whose cross sections taken in the direction perpendicular to the sheet face, that is, perpendicular to the direction in which the light-entering-side unit lenses 121 extend, are equilateral triangles (see FIG. 15) are arranged in the direction of the sheet face.

Namely, in the convergent sheet 12, the direction in which the light-entering-side unit lenses 121 provided on the light-entering side extend and the direction in which the unit prisms in the convergent lens array 123 provided on the light-emerging side extend are perpendicular to each other.

In the surface light source unit 16 shown in FIG. 1, although the convergent sheet 12 is arranged so that the direction in which the light-entering-side unit lenses 121 extend agrees with the longer direction of the cathode ray tubes 13 and that the direction in which the unit prisms in the convergent lens array 123 extend is perpendicular to the longer direction of the cathode ray tubes 13, the convergent sheet 12 may be turned 90° on the sheet face. Namely, the convergent sheet 12 may be arranged so that the direction in which the light-entering-side unit lenses 121 extend is perpendicular to the longer direction of the cathode ray tubes 13 and that the direction in which the unit prisms in the convergent lens array 123 extend agrees with the longer direction of the cathode ray tubes 13.

The convergent sheet 12 will be hereinafter described in detail with reference to FIGS. 9 to 14.

Figure 9:
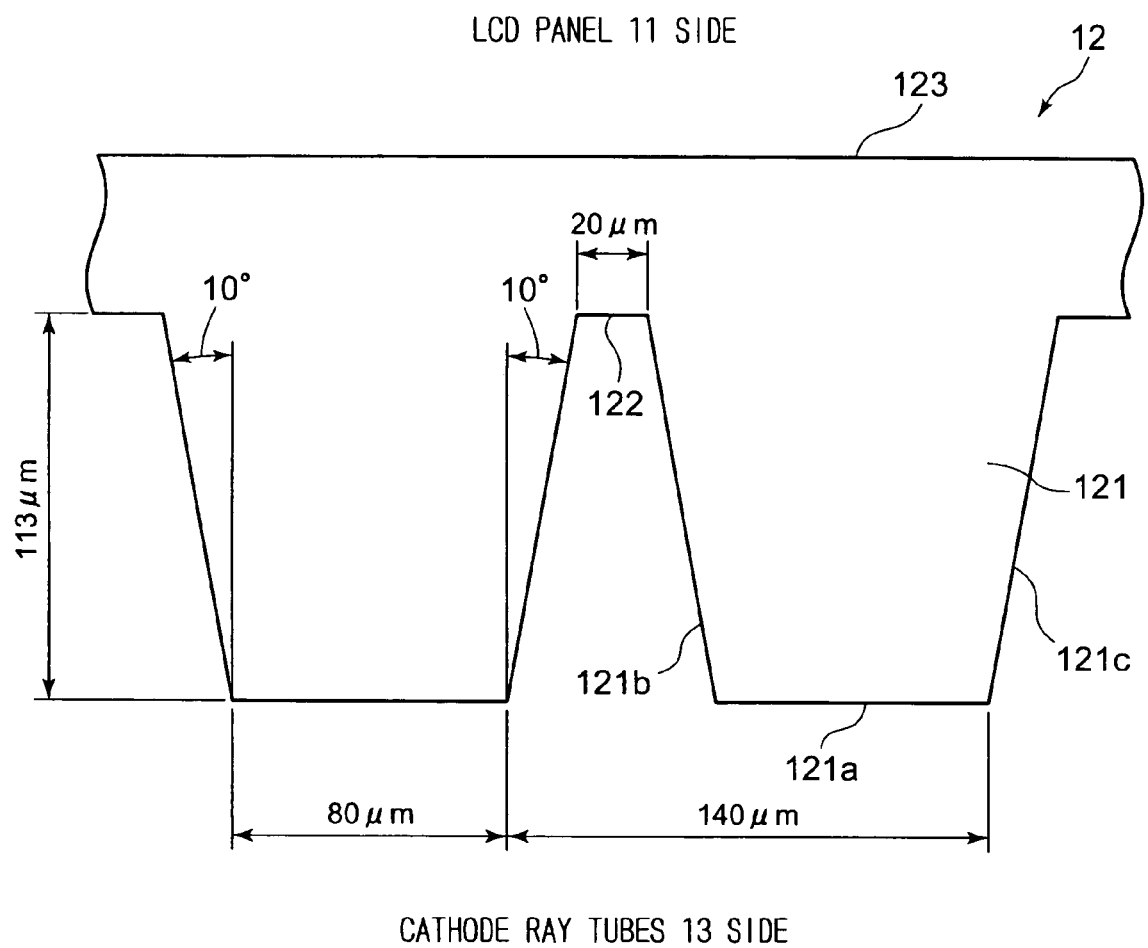
FIG. 9 is an enlarged sectional view of the convergent sheet, taken along line IX-IX of FIG. 8.

FIG. 9 is an enlarged sectional view of the convergent sheet 12, taken along line IX-IX of FIG. 8. In the cross section shown in FIG. 9, the convergent lens array 123 is indicated by a straight line and can be assumed to be flat when the tracing of light rays is made within this cross section. Therefore, in the following explanation that is given with reference to FIGS. 9 to 14, the convergent lens array 123 is assumed to be flat.

As shown in FIG. 9, the light-entering-side unit lenses 121 on the light-entering side of the convergent sheet 12 have trapezoidal cross sections as described above; they are formed so that the upper sides of the trapezoids protrude toward the cathode ray tubes 13 side. In the first embodiment of the present invention, the upper side 121a of the light-entering-side unit lens 121 has a width of 80 μm, and an oblique side 121b, 121c makes an angle of 10° with the normal to the convergent sheet 12, as exemplarily shown in FIG. 9. Further, the pitch of the light-entering-side unit lenses 121 is 140 μm, and a flat part 122 with a width of 20 μm is formed between each two adjacent light-entering-side unit lenses 121 in parallel with the convergent lens array 123. The height of the light-entering-side unit lenses 121 (the distance between the upper side and the part corresponding to the lower side of the trapezoid) is determined by the dimensions of the other parts described above and is approximately 113 μm.

Next, the optical action of the light-entering-side unit lenses 121 on the convergent sheet 12 of the above-described construction will be described with reference to FIGS. 10 to 14.

Figure 10:
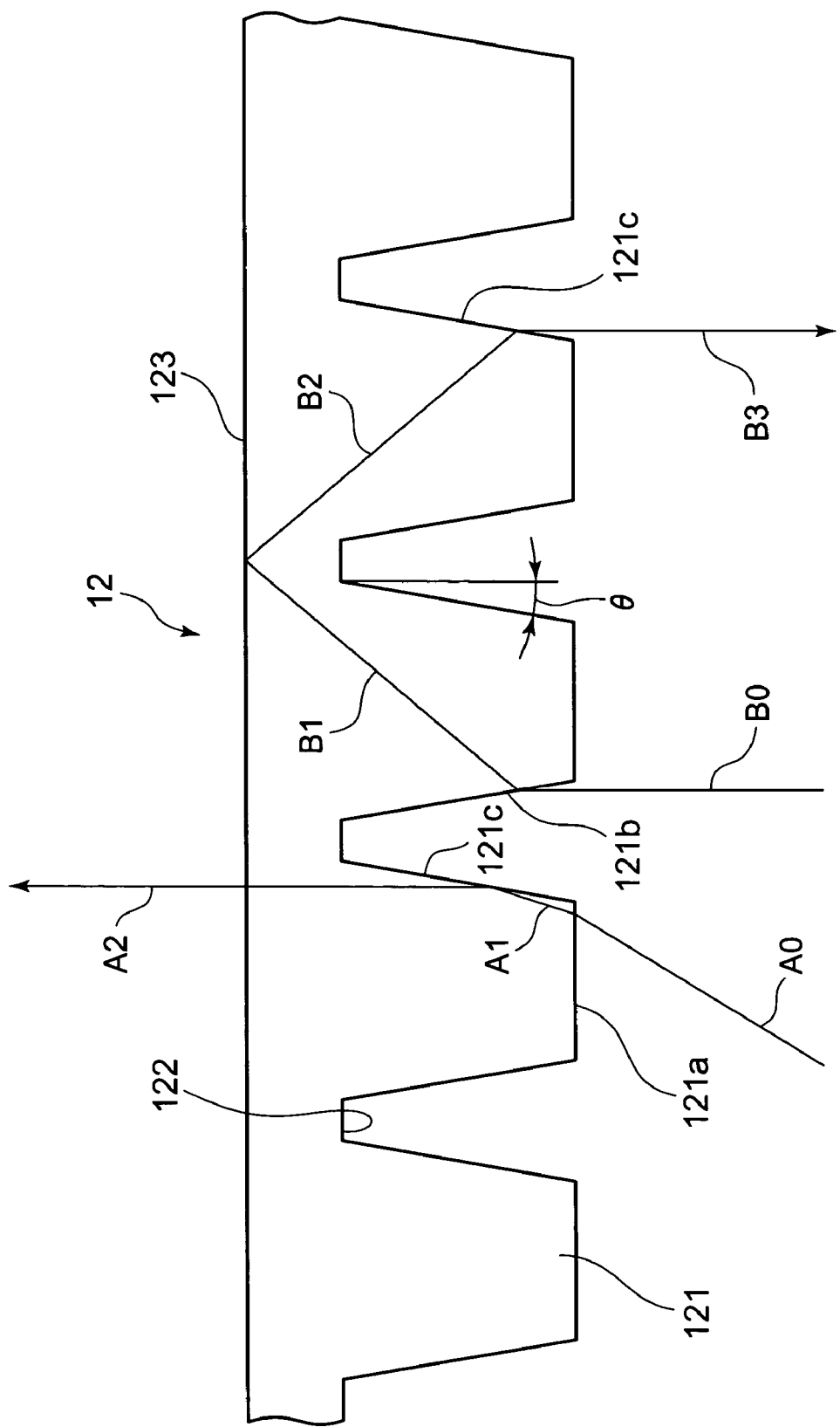
FIG. 10 is a view illustrating the optical action of the light-entering-side unit lenses on the convergent sheet shown in FIG. 8.

As shown in FIG. 10, the convergent sheet 12 is incorporated so that light that has entered the convergent sheet 12 at a large angle with the sheet face emerges from the plane of emergence (the convergent lens array 123) at an angle as small as possible (so that the light enters the LCD panel 11 almost vertically). To attain this, the light-entering-side unit lenses 121 are formed on the light-entering side (the cathode ray tubes side 13) surface of the convergent sheet 12. In FIG. 10, a light ray A0 that has entered the upper side 121a of the light-entering-side unit lens 121 from the light-entering side (the cathode ray tubes 13 side) at a large angle is refracted to be a light ray A1 and reaches the oblique side 121c. The light ray A1 is totally reflected from the oblique side 121c to be a light ray A2. This light ray A2 travels in the direction that is greatly different from the direction in which the light ray A0 has traveled, and emerges from the convergent lens array 123 on the light-emerging side (the LCD panel 11 side). The light rays A0, A1 and A2 shown in FIG. 10 illustrate the case where the light ray A2 emerges from the convergent lens array 123 at an angle of 0°.

All of the light that enters the convergent sheet 12 is not necessarily incident on the upper sides 121a of the light-entering-side unit lenses 121. If the light that has entered the oblique side 121b of the light-entering-side unit lens 121 is refracted and emerges from the plane of emergence (the convergent lens array 123) as it is, this light enters the LCD panel 11 at an angle of incidence greater than that at which the light has entered the convergent sheet 12. It is therefore preferable to make the plane of emergence totally reflect the light that has entered the oblique sides 121b of the light-entering-side unit lenses 121 toward the light-entering side (the cathode ray tubes 13 side), and to re-use the returned light to improve optical efficiency.

Specifically, in order to obtain an increased rate of the re-use of the light that has entered the oblique sides 121b of the light-entering-side unit lenses 121, it is preferable to design the convergent sheet 12 so that the angle of inclination θ of the oblique side 121b (the angle between the normal to the convergent sheet 12 and the oblique side 121b, 121c of the trapezoidal cross section of the light-entering-side unit lens 121) and the refractive index n of the convergent sheet 12 fulfill the following formula (1):

$$\sin(90-\theta-\arcsin(\cos\theta/n)) > 1/n \qquad (1).$$

As long as the above formula is fulfilled, even if a light ray vertically entering the convergent sheet 12, like the light ray B0 shown in FIG. 10, is incident on the oblique side 121b to be a light ray B1, the light ray B1 is totally reflected from the plane of emergence (the convergent lens array 123) and is returned to be a light ray B2. This light ray B2 is reflected from the oblique side 121c and is returned to the light-entering side (the cathode ray tubes 13 side), so that it can be re-used. In the convergent sheet 12 shown in FIG. 9, the angle of inclination θ of the oblique side 121b, 121c is 10° and the refractive index n is 1.55. When these values are substituted in the above formula (1), the left side is nearly equal to 0.650, and the right side, nearly equal to 0.645; this shows that these values fulfill the above formula (1).

If the light that has entered the oblique side 121b of the light-entering-side unit lens 121 strikes another oblique side 121c, this light is not totally reflected from the plane of emergence (the convergent lens array 123) and cannot be re-used. As the length corresponding to the height of the trapezoidal cross sections of the light-entering-side unit lenses 121 increases, the amount of light that strikes the oblique sides 121c after entering the oblique sides 121b of the light-entering-side unit lenses 121 increases. In order to decrease the amount of such light, it is preferable not to excessively increase the height of the trapezoidal cross sections of the light-entering-side unit lenses 121. Specifically, it is preferable that the value obtained by dividing this height by the width of the upper side 121a be in the range of 0.5 to 3.

In determining the above value (the ratio of the height of the light-entering-side unit lens 121 to the width of the upper side 121a of the same), various factors should be taken into consideration depending on the design of the convergent sheet 12, so that it is not easy to determine the optimum value. For example, when the trapezoidal cross sections of the light-entering-side unit lenses 121 are excessively large in height, light that has emerged from one slant (the oblique side 121b) is totally reflected from the other slant (the oblique side 121c), so that this reflected light emerges at a great angle. On the other hand, when the trapezoidal cross sections of the light-entering-side unit lenses 121 are excessively small in height, the convergent sheet 12 is poor in the ability to converge light (especially, in the ability to converge light that has entered at an angle between 30° and 60°). In general, however, if the above-described ratio is made from 0.5 to 3, the convergent sheet 12 can show the enhanced converging effect with the angle of emergence maintained at moderate values. In the convergent sheet 12 exemplarily shown in FIG. 9, since the width of the upper side 121a of the light-entering-side unit lens 121 is 80 μm and the height of the same is 13 μm, the above-described ratio (113/80) is 1.4125. These values of the width and the height thus fulfill the above-described requirement.

By so constructing the convergent sheet 12, it is possible to decrease the amount of light that strikes the oblique sides 121c after entering the oblique sides 121b of the light-entering-side unit lenses 121. In the convergent sheet 12 exemplarily shown in FIG. 9, it has been known from simulations that approximately 6% of the light that has entered the convergent sheet 12 at an angle of incidence of 20° are incident on and refracted by the oblique side 121b and reach the second oblique side 121c existing on the opposite side of the oblique side 121b.

The lower is the above-described percentage, the better. However, as long as not more than 20% of the light that has entered the convergent sheet 12 at an angle of incidence of 20° are incident on and refracted by the oblique side 121b and reach the second oblique side 121c existing on the opposite side of the oblique side 121b, the convergent sheet 12 is practically effective for use in a surface light source unit. The reason for this is as follows: light observed from the front falls in a range of about 20° or less when indicated by viewing angle, so that if the above-described percentage is 20% or less, the substantial loss of light in the above-described range of viewing angle can be reduced.

The following Table 2 shows the relationship between the percentage of the light that is incident on and refracted by the oblique side 121b and reaches the second oblique side 121c existing on the opposite side of the oblique side 121b to the light that has entered the convergent sheet 12 at an angle of 20° (the percentage of the 20° incident light that reaches the oblique side 121c) and the percentage of the amount of the light emerging from the convergent sheet 12 at an angle of 20° or less to the amount of the light that has entered the convergent sheet 12 at an angle of 20° or less after passing through the diffuser 14.

TABLE 2

| Percentage of 20° Incident Light That Reaches Oblique Side 121c | Percentage of Amount of Light Emerging at Angle of 20° or Less to Amount of Light That Has Entered at an Angle of 20° or Less |
| --- | --- |
| 5% | 140% |
| 10% | 135% |
| 20% | 110% |
| 30% | 100% |
| 50% | 90% |

As is clear also from the results shown in FIG. 2, it is preferable, as mentioned above, that the amount of the light that is incident on and refracted by the oblique side 121b and reaches the second oblique side 121c existing on the opposite side of the oblique side 121b be made not more than 20% of the light that has entered the convergent sheet 12 at an angle of 20°.

Figure 11:
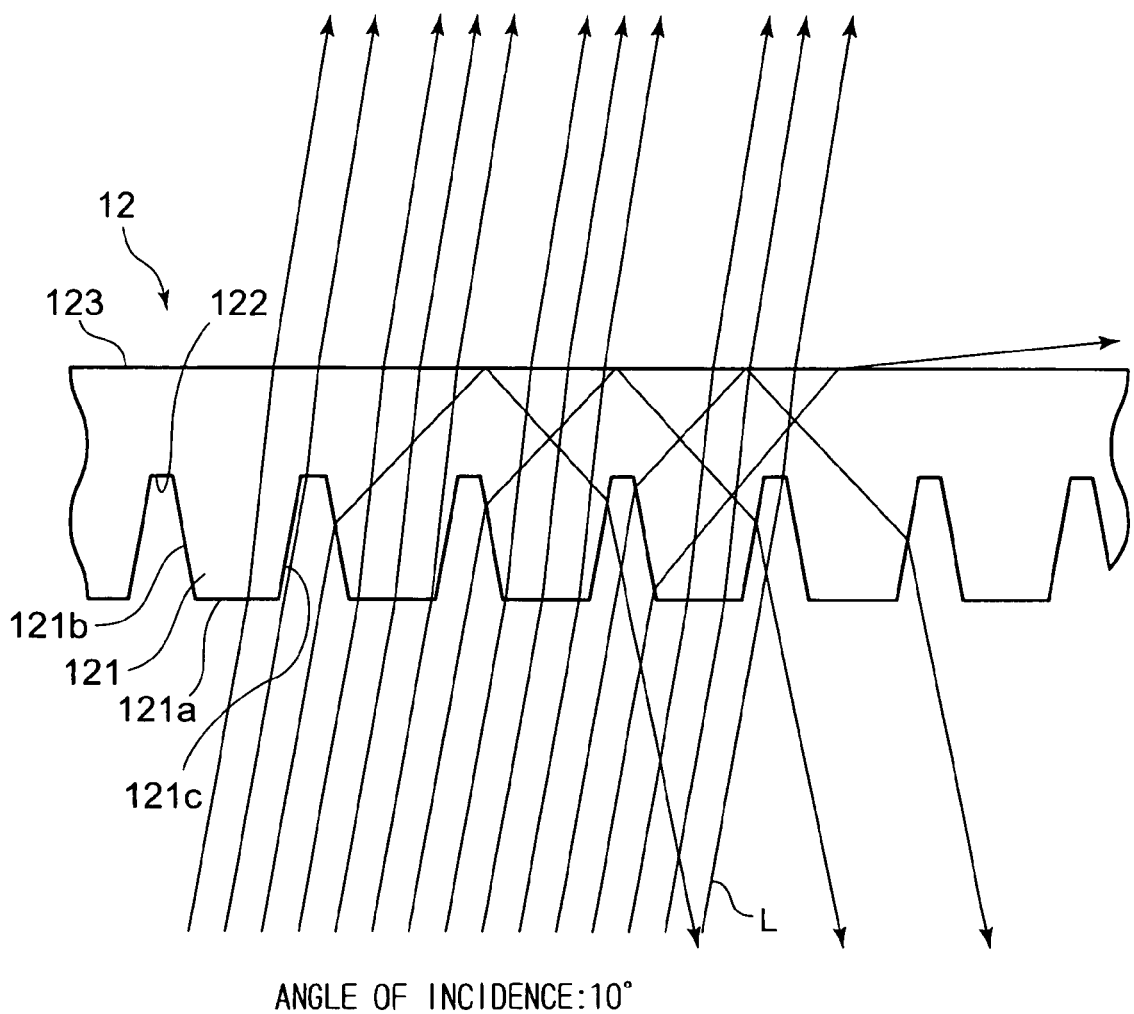
FIG. 11 is a view showing the result of simulations of tracing of parallel light that has entered the convergent sheet shown in FIG. 8 at an angle of incidence of 10°.
Figure 12:
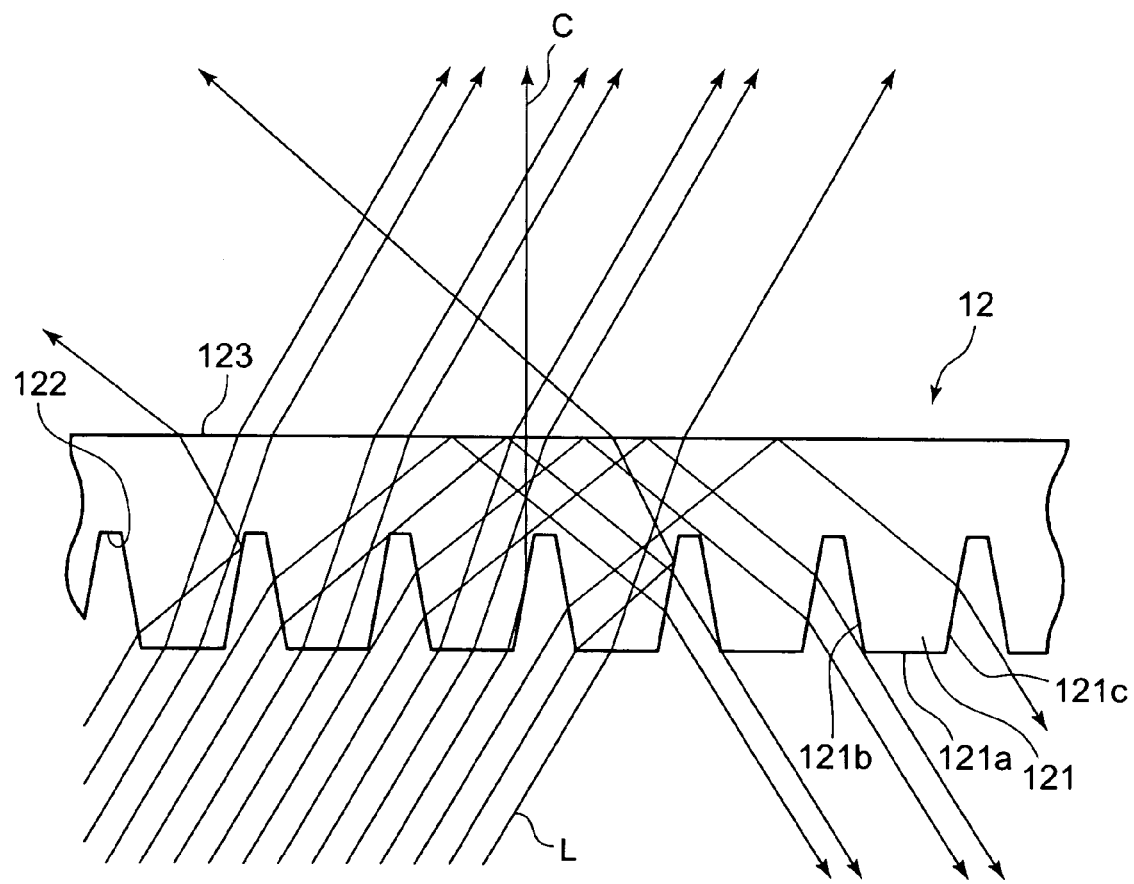
FIG. 12 is a view showing the result of simulations of tracing of parallel light that has entered the convergent sheet shown in FIG. 8 at an angle of incidence of 30°.

The state of parallel light after entering the convergent sheet 12 of the above-described construction will be described with reference to FIGS. 11 and 12. FIG. 11 is a view showing the result of simulations of tracing of parallel light L that has entered the convergent sheet 12 at an angle of incidence of 10°. FIG. 12 is a view showing the result of simulations of tracing of parallel light L that has entered the convergent sheet 12 at an angle of incidence of 30°.

In the case shown in FIG. 11 (in the case where the angle of incidence of light is small), although light rays that have entered the upper sides 121a of the light-entering-side unit lenses 121 are refracted within the convergent sheet 12, they emerge from the convergent sheet 12 at the same angle as the angle of incidence. On the other hand, light rays that have entered the oblique sides 121b of the light-entering-side unit lenses 121 are returned to the light source side and are re-used. On the contrary, in the case shown in FIG. 12 (in the case where the angle of incidence of light is greater than that in the case shown in FIG. 11), a light ray (C) that emerges from the convergent sheet 12 in the corrected direction is produced, and the existence of the light-converging action can thus be confirmed.

In the convergent sheet 12 shown in FIGS. 8 to 12, a flat part 122 is present between each two adjacent light-entering-side unit lenses 121. Although these flat parts 122 are not always essential, their existence somewhat influences the optical action of the convergent sheet 12.

Figure 13:
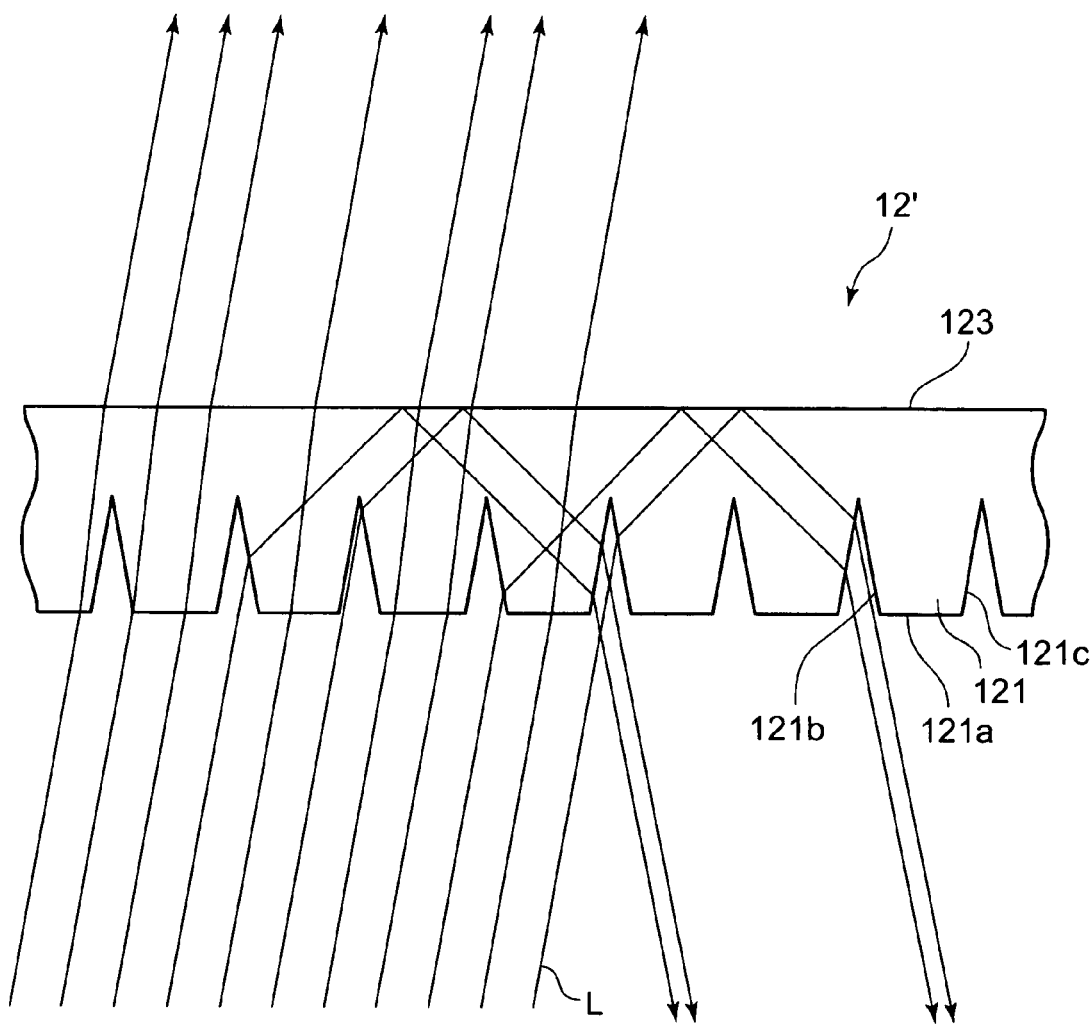
FIG. 13 is a view showing the result of simulations of tracing of parallel light that has, at an angle of incidence of 10°, entered a convergent sheet having no flat part between each two adjacent light-entering-side unit lenses.
Figure 14:
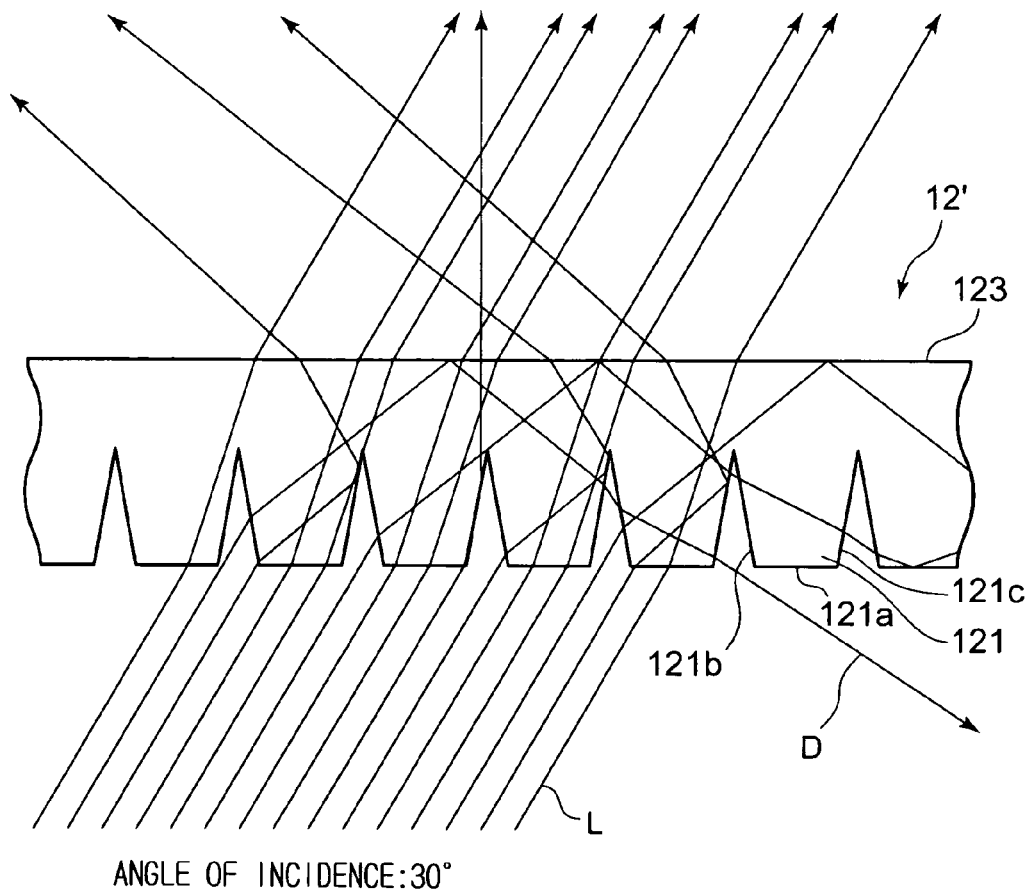
FIG. 14 is a view showing the result of simulations of tracing of parallel light that has, at an angle of incidence of 30°, entered a convergent sheet having no flat part between each two adjacent light-entering-side unit lenses.

The state of parallel light after entering a convergent sheet 12' having no flat parts 122 between the light-entering-side unit lenses 121 will now be described with reference to FIGS. 13 and 14. FIG. 13 is a view showing the result of simulations of tracing of parallel light L that has entered the convergent sheet 12' at an angle of incidence of 10°. FIG. 14 is a view showing the result of simulations of tracing of parallel light L that has entered the convergent sheet 12' at an angle of incidence of 30°.

As long as FIG. 13 is compared with FIG. 11 that shows the result of simulations run by the use of the convergent sheet 12 having the flat parts 122 between the light-entering-side unit lenses 121, it can be said that there is no significant difference between the optical action of the convergent sheet 12' and that of the convergent sheet 12. However, referring to FIG. 14, some of the light rays that have entered the oblique sides 121b of the light-entering-side unit lenses 121 on the convergent sheet 12' and have then been totally reflected from the plane of emergence (the convergent lens array 123) emerge from the oblique sides 121c toward the light source side (the cathode ray tubes 13 side) and re-enter the oblique sides 121b to become stray light D. Such stray light D occurs because the flat parts 122 are absent between the light-entering-side unit lenses 121. To drastically reduce the frequency of occurrence of such stray light, it is preferable that the flat parts 122 be present between the light-entering-side unit lenses 121, as in the convergent sheet 12 shown in FIGS. 8 to 12.

Further, a mold needed to form the convergent sheet 12' having no flat parts 22 between the light-entering-side unit lenses 121 as is shown in FIGS. 13 and 14 is to have sharp protruding portions on the molding surface, so that it becomes difficult to secure the accuracy and the strength of the mold. This inconvenience is avoidable if the flat parts 122 are provided between the light-entering-side unit lenses 121 as in the convergent sheet 12 shown in FIGS. 8 to 12.

Figure 15:
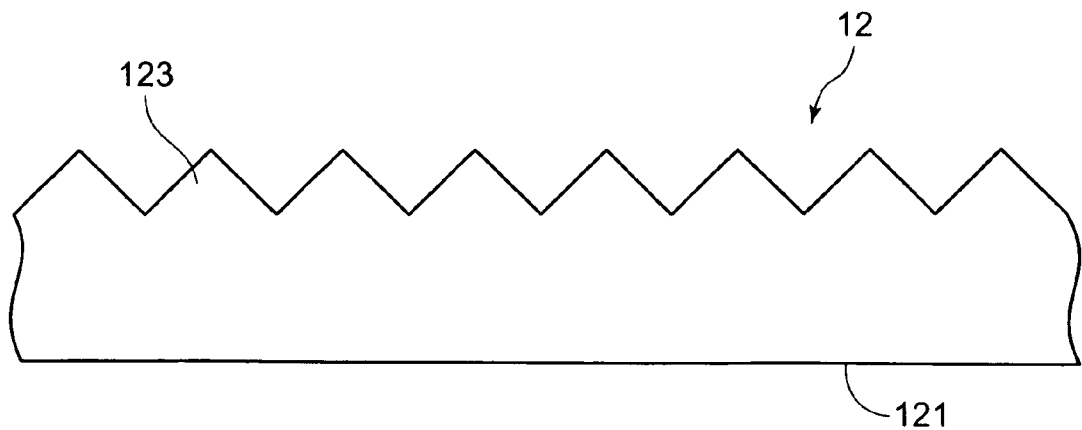
FIG. 15 is an enlarged sectional view of the convergent sheet, taken along line XV-XV of FIG. 8.

FIG. 15 is an enlarged sectional view of the convergent sheet 12, taken along line XV-XV of FIG. 8. As shown in FIG. 15, the convergent lens array 123 provided on the light-emerging side surface of the convergent sheet 12 has a plurality of prisms whose cross sections are rectangular equilateral triangles and can converge emerging light due to these unit prisms.

Thus, the convergent sheet 12 can converge, in the direction perpendicular to the cathode ray tubes 13, the illumination light due to the light-entering-side unit prisms 121 provided on the light-entering side, and also converge, in the direction parallel to the cathode ray tubes 13, the illumination light due to the convergent lens array 123 provided on the light-emerging side.

The reflective polarizer 15 is a sheet capable of increasing luminance without decreasing viewing angle and is placed between the LCD panel 11 and the convergent sheet 12. For example, DBEF (manufactured by Sumitomo 3M Limited, Japan) may be used as the reflective polarizer 15.

Figure 16:
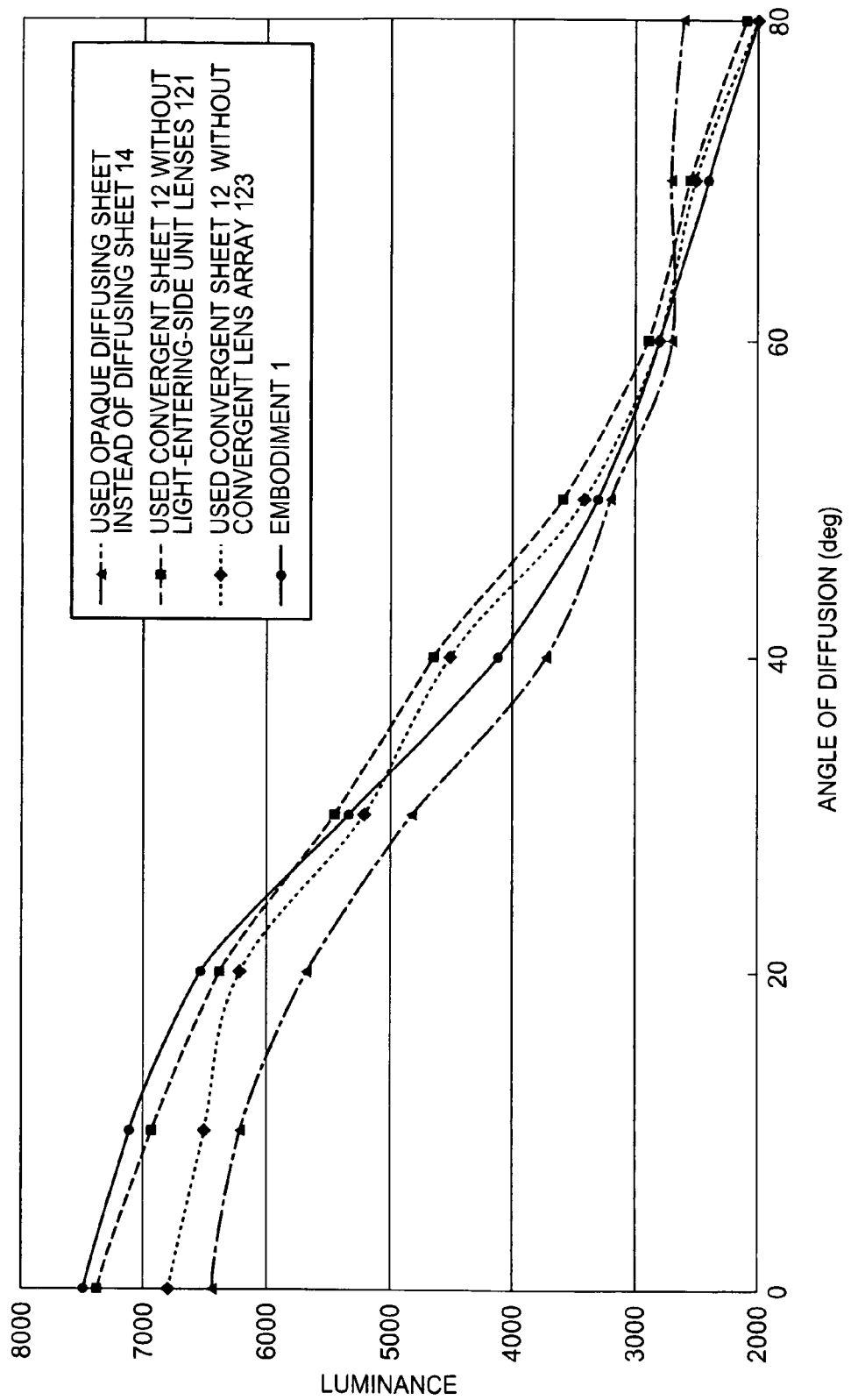
FIG. 16 is a diagram showing the luminance distribution in the vertical direction on a surface light source unit comprising the diffusing sheet according to the first embodiment of the present invention, in comparison with the luminance distributions in the vertical direction on surface light source units of other types.
Figure 17:
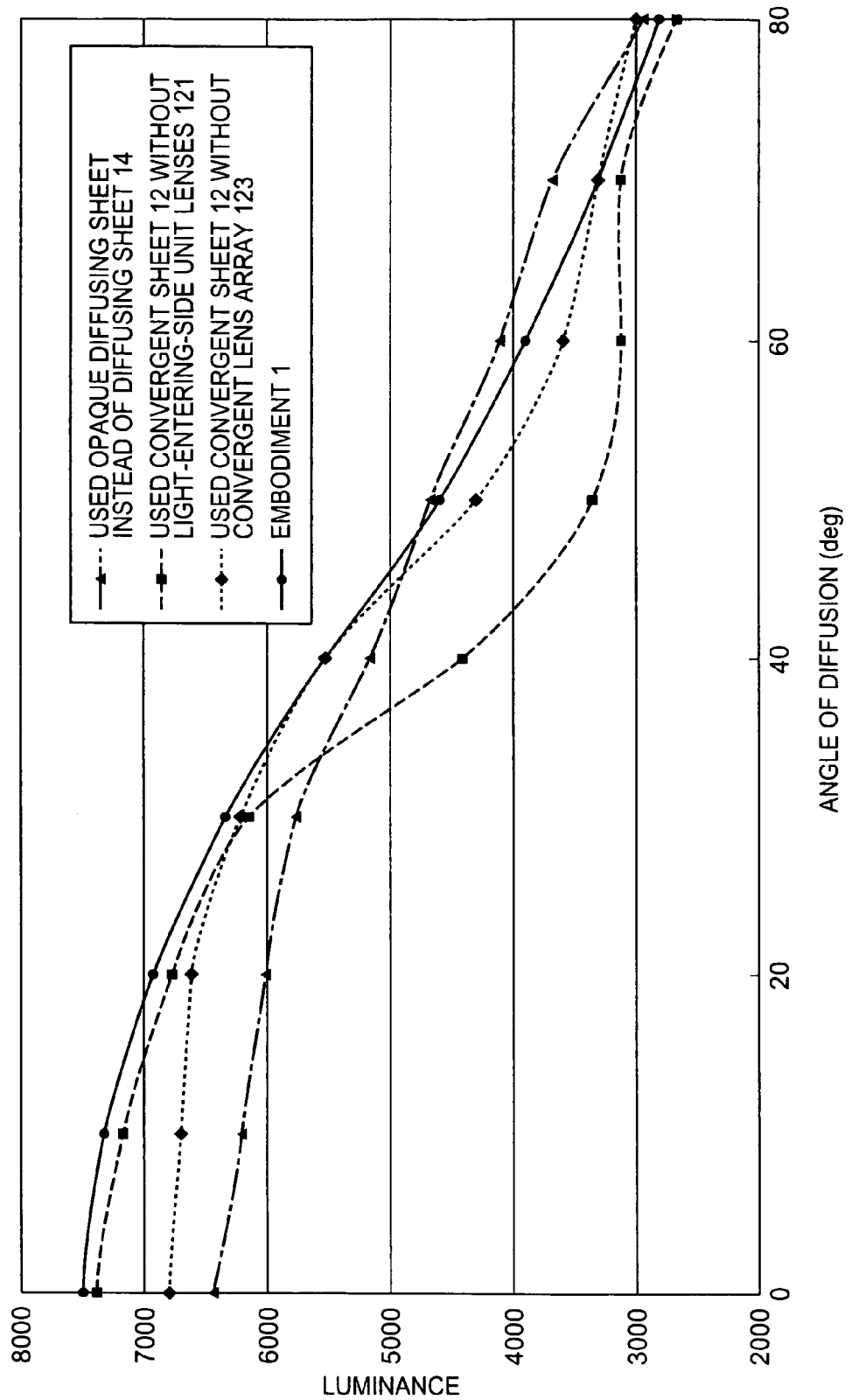
FIG. 17 is a diagram showing the luminance distribution in the horizontal direction on a surface light source unit comprising the diffusing sheet according to the first embodiment of the present invention, in comparison with the luminance distributions in the horizontal direction on surface light source units of other types.

Next, in order to describe more specifically the optical action of each sheet in the surface light source unit 16 of the above-described construction, the luminance distribution on the surface light source unit 16 will be described in comparison with those on surface light source units of other types that are different from the surface light source unit 16 in sheet construction. FIG. 16 shows diagrams of the luminance distributions in the vertical direction on the surface light source units in such a manner that the effect of each sheet can be understood. FIG. 17 shows diagrams of the luminance distributions in the horizontal direction on the surface light source units in such a manner that the effect of each sheet can be understood. In FIGS. 16 and 17, the solid-line curves with dot marks indicate the characteristics of the surface light source unit 16 according to the first embodiment of the present invention (Embodiment 1).

(Effect of Diffusing Sheet 14)

First, the effect of the diffusing sheet 14 will be described.

In FIGS. 16 and 17, the chain-line curves with triangular marks indicate the characteristics of a surface light source unit that is the same as the surface light source unit 16 according to the first embodiment of the present invention, except that the diffusing sheet 14 is replaced with an opaque diffuser.

As shown in FIGS. 16 and 17, the luminance obtained when the diffusing sheet 14 according to the first embodiment of the present invention is used is, at almost every angle of diffusion, higher than that obtained when the opaque diffuser is used. The reason for this is as follows: although the opaque diffuser is excellent in the diffusing effect, it diffuses a large amount of light in such a direction that the diffused light cannot be used, so that the amount of usable light is small as a whole; while the diffusing sheet 14 according to the first embodiment of the present invention can properly change the direction in which light from the cathode ray tubes 13 serving as a light source emerges, depending on the angle of incidence at which the light has entered the diffusing sheet 14, so that it is possible to increase optical efficiency while obtaining the diffusing effect required.

Both the surface light source unit 16 using the diffusing sheet 14 according to the first embodiment of the present invention and the surface light source unit using the opaque diffuser did not cause such unevenness or non-uniformity of luminance that the positions of the cathode ray tubes 13 serving as a light source can be visually identified on the screen, and satisfactorily showed the diffusing effect required.

(Effect of Light-Entering-Side Unit Lenses 121 on Convergent Sheet 12)

The effect of the light-entering-side unit lenses 121 on the convergent sheet 12 will be described.

In FIGS. 16 and 17, the broken-line curves with square marks indicate the characteristics of a surface light source unit that is the same as the surface light source unit 16 according to the first embodiment of the present invention, except that the light-entering-side unit lenses 121 having nearly trapezoidal cross sections, provided on the cathode ray tubes 13 side surface of the convergent sheet 12, are omitted to make the plane of incidence flat.

As shown in FIGS. 16 and 17, in the case where the convergent sheet 12 having the light-entering-side unit lenses 121 according to the first embodiment of the present invention is used, the luminance is higher at an angle of diffusion of around 0 to 30° in the diagram showing the characteristics in the vertical direction (FIG. 16) because the light-entering-side unit lenses 21 has the function of converging light in the vertical direction, and the luminance is entirely higher in the diagram showing the characteristics in the horizontal direction (FIG. 17). The characteristics in the horizontal direction shown in FIG. 17 indicate the luminance in the horizontal direction determined at the point at a vertical angle of 0° at which the luminance is higher as described above.

(Effect of Convergent Lens Array 123 on Convergent Sheet 12)

The effect of the convergent lens array 123 on the convergent sheet 12 will be described below.

In FIGS. 16 and 17, the dotted-line curves with rhombic marks indicate the characteristics of a surface light source unit that is the same as the surface light source unit 16 according to the first embodiment of the present invention, except that the convergent lens array 123 having unit lenses with equilateral triangular cross sections, provided on the LCD panel 11 side surface of the convergent sheet 12, is omitted to make the plane of emergence flat.

As shown in FIGS. 16 and 17, in the case where the convergent sheet 12 having the convergent lens array 123 according to the first embodiment of the present invention is used, the luminance is entirely higher in the diagram showing the characteristics in the horizontal direction (FIG. 17) because the convergent lens array 123 has the function of converging light in the horizontal direction. Further, the luminance around the center of the diagram showing the characteristics in the vertical direction (FIG. 16) is higher.

Thus, according to the first embodiment of the present invention, in the surface light source unit 16 of direct type in which a plurality of the cathode ray tubes 13 are arranged in parallel, since the diffusing sheet 14 having, at least on its light-emerging side surface, the diffusion lens array 141 is incorporated, it is possible to attain uniform illumination without decreasing optical efficiency.

Further, the unit lenses constituting the diffusion lens array 141 on the diffusing sheet 14 are in the shape of a part of continuous elliptic cylinders whose major axes are perpendicular to the sheet face, so that their diffusing properties can be freely controlled as compared with cylindrical or spherical unit lenses.

Furthermore, since the semimajor axis of each unit lens in the diffusion lens array 141 on the diffusing sheet 14 is from 1.5 to 3 times the semiminor axis of the same, the diffusing sheet 14 is useful in attaining uniform illumination without reducing optical efficiency.

Embodiment 2

Next, a transmission type display according to the second embodiment of the present invention will be described hereinafter with reference to FIGS. 18 to 21. The second embodiment of the present invention is basically the same as the first embodiment shown in FIGS. 1 to 17, except that, instead of the convergent sheet 12 according to the first embodiment, a convergent sheet 22 having light-entering-side unit lenses 221 that are an improvement in shape over the light-entering-side unit lenses 121 is used in the surface light source unit in the transmission type display. Like reference numerals designate like or corresponding parts throughout FIGS. 1 to 17 that show the first embodiment and FIGS. 18 to 21 that show the second embodiment, and explanation that has been given already on such parts will be omitted in the following description.

Figure 18:
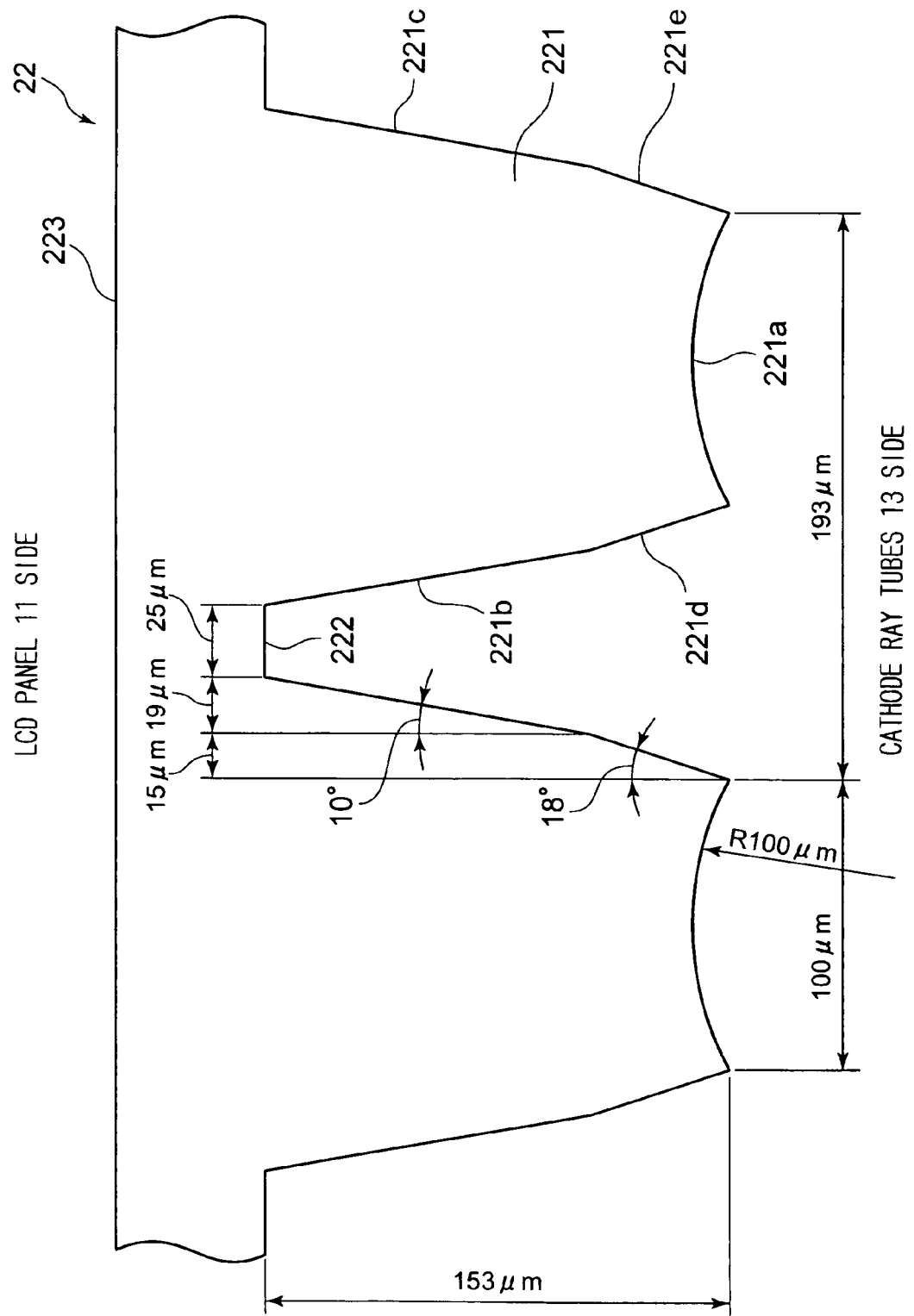
FIG. 18 is an enlarged sectional view of a convergent sheet contained in a surface light source unit in a transmission type display according to the second embodiment of the present invention.

A convergent sheet 22 according to the second embodiment of the present invention, whose cross section is shown in FIG. 18, has on its light-entering side (cathode ray tubes 13 side) surface, a plurality of light-entering-side unit lenses 221 arranged in the direction of the sheet face.

The light-entering-side unit lenses 221 are an improvement over the light-entering-side unit lenses 121 with trapezoidal cross sections according to the first embodiment of the present invention, in the shapes of the upper sides and the oblique sides of the trapezoidal cross sections of the light-entering-side unit lenses 121. Specifically, the upper side 121$a$ in the aforementioned first embodiment is flat, while the upper side 221$a$ in the second embodiment of the present invention is curved inward to the light-emerging side to be concave.

In the second embodiment of the present invention, the concave upper side 221$a$ is in the shape of an arc of a circle with a radius of 100 μm and has a width of 100 μm, as exemplarily shown in FIG. 18. By thus making the upper sides 221$a$ of the light-entering-side unit lenses 221 concave, it is possible to increase the amount of light rays that strike the oblique sides (e.g., oblique sides 221$c$, 221$e$) after entering the upper sides 221$a$, thereby further enhancing the light converging effect.

Further, as exemplarily shown in FIG. 18, the oblique sides 221$b$, 221$d$ (221$c$, 221$e$) are a combination of two planes in the second embodiment of the present invention, although the oblique side 121$b$, 121$c$ is one plane in the above-described first embodiment. Thanks to such oblique sides, the following effects can be obtained. Namely, light that has entered the convergent sheet 22 at a large angle of incidence enters the upper side 221$a$ and then reaches the oblique side (e.g., the oblique side 221$c$, 221$e$), and if this light is incident on the oblique side (e.g., the oblique side 221$c$, 221$e$) at an angle of incidence (the angle between the incident light and the oblique side) below the critical angle, the light is not totally reflected from but emerges from the oblique side (e.g., the oblique side 221$c$, 221$e$) to become stray light. On the contrary, in the second embodiment of the present invention, light that has entered the convergent sheet 22 at a large angle of incidence enters the upper side 221$a$ and then reaches the oblique side in which the angle of inclination of the oblique side 221$e$ (221$d$) situated near the upper side 221$a$ is greater than that of the oblique side 221$c$ (221$b$). The amount of light that unfavorably emerges from the oblique side 221$e$ (221$d$) can therefore be decreased.

In the second embodiment of the present invention, the angle of inclination of the oblique side 221$b$, 221$c$ is 10°, which is the same as in the aforementioned first embodiment, and the angle of inclination of the oblique side 221$d$, 221$e$ situated near the upper side 221$a$ is 18°, as exemplarily shown in FIG. 18. Further, the boundary between the oblique side 221$b$ (221$c$) and the oblique side 221$d$ (221$e$) is present at a point 19 μm apart, in the direction toward the center of the trapezoid, from the edge of the part corresponding to the lower side of the trapezoid, and the boundary between the oblique side 221$d$ (221$e$) and the upper side 221$a$ exists at a point 15 μm apart from the above boundary in the direction toward the center of the trapezoid. The height of the light-entering-side unit lenses 221 (the distance between the upper side and the part corresponding to the lower side of the trapezoid) is determined by the above-described dimensions of the other parts and is 153 μm. The pitch of the light-entering-side unit lenses 221 is 193 μm, and a flat part 222 with a width of 25 μm exists between each two adjacent light-entering-side unit lenses 221 in parallel with the convergent lens array 223.

Figure 19:
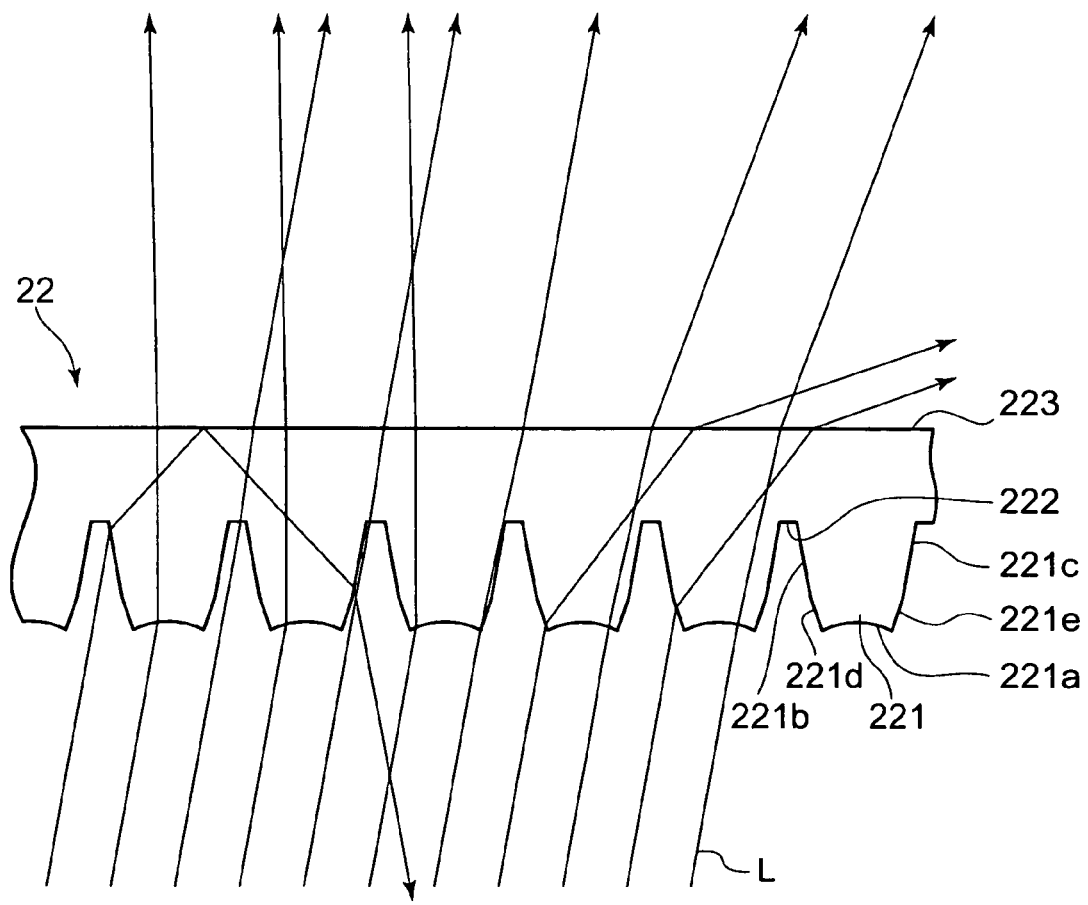
FIG. 19 is a view showing the result of simulations of tracing of parallel light that has entered the convergent sheet shown in FIG. 18 at an angle of incidence of 10°.
Figure 20:
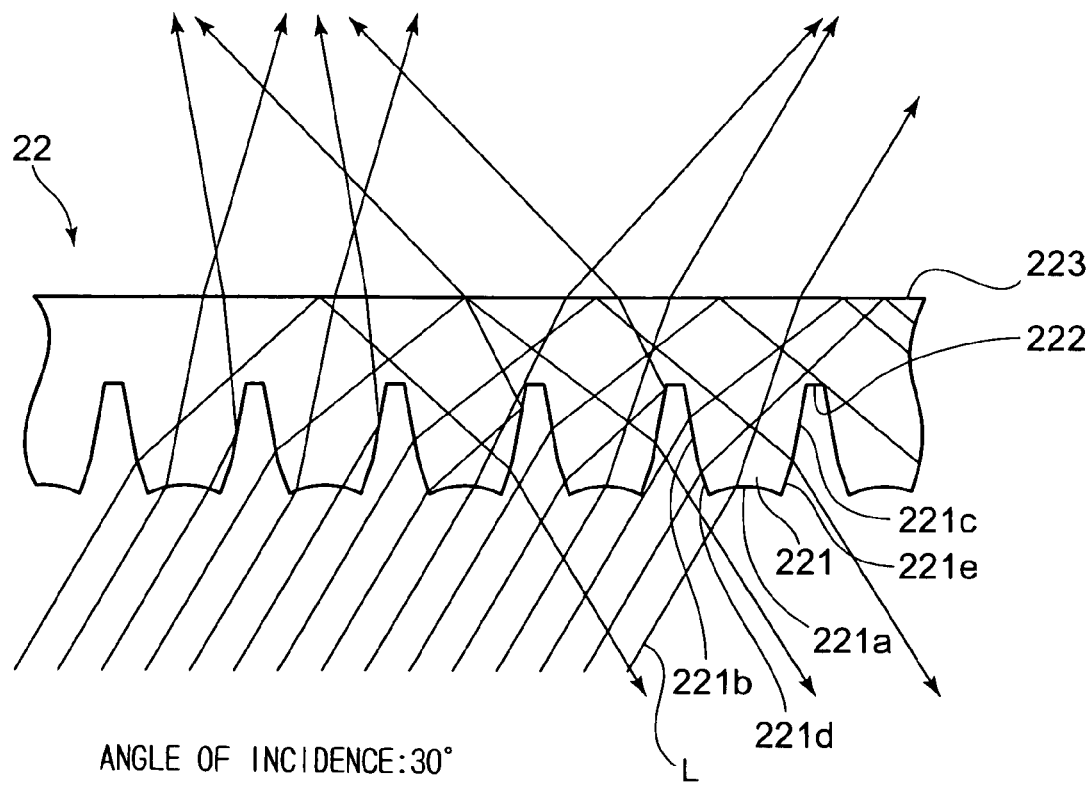
FIG. 20 is a view showing the result of simulations of tracing of parallel light that has entered the convergent sheet shown in FIG. 18 at an angle of incidence of 30°.

Next, the state of parallel light after entering the convergent sheet 22 of the above-described construction will be described with reference to FIGS. 19 and 20. FIG. 19 is a view showing the result of simulations of tracing of parallel light L that has entered the convergent sheet 22 at an angle of incidence of 10°. FIG. 20 is a view showing the result of simulations of tracing of parallel light L that has entered the convergent sheet 22 at an angle of incidence of 30°.

When FIGS. 19 and 20 are compared with FIGS. 11 and 12 that show the aforementioned first embodiment, it can be understood that because of the improved upper sides 221a of the light-entering-side unit lenses 221, an increased number of light rays strike the oblique sides (e.g., the oblique sides 221c, 221e) after entering the upper sides 221a to enhance the converging effect.

Next, the luminance distribution (luminance distribution in the vertical direction) on the surface light source unit 16 comprising the convergent sheet 22 of the above-described construction will be described with reference to FIG. 21, by comparison with the luminance distribution on the surface light source unit 16 comprising the convergent sheet 12 according to the aforementioned first embodiment and that on a surface light source unit comprising neither the convergent sheet 12 nor 22.

Figure 21:
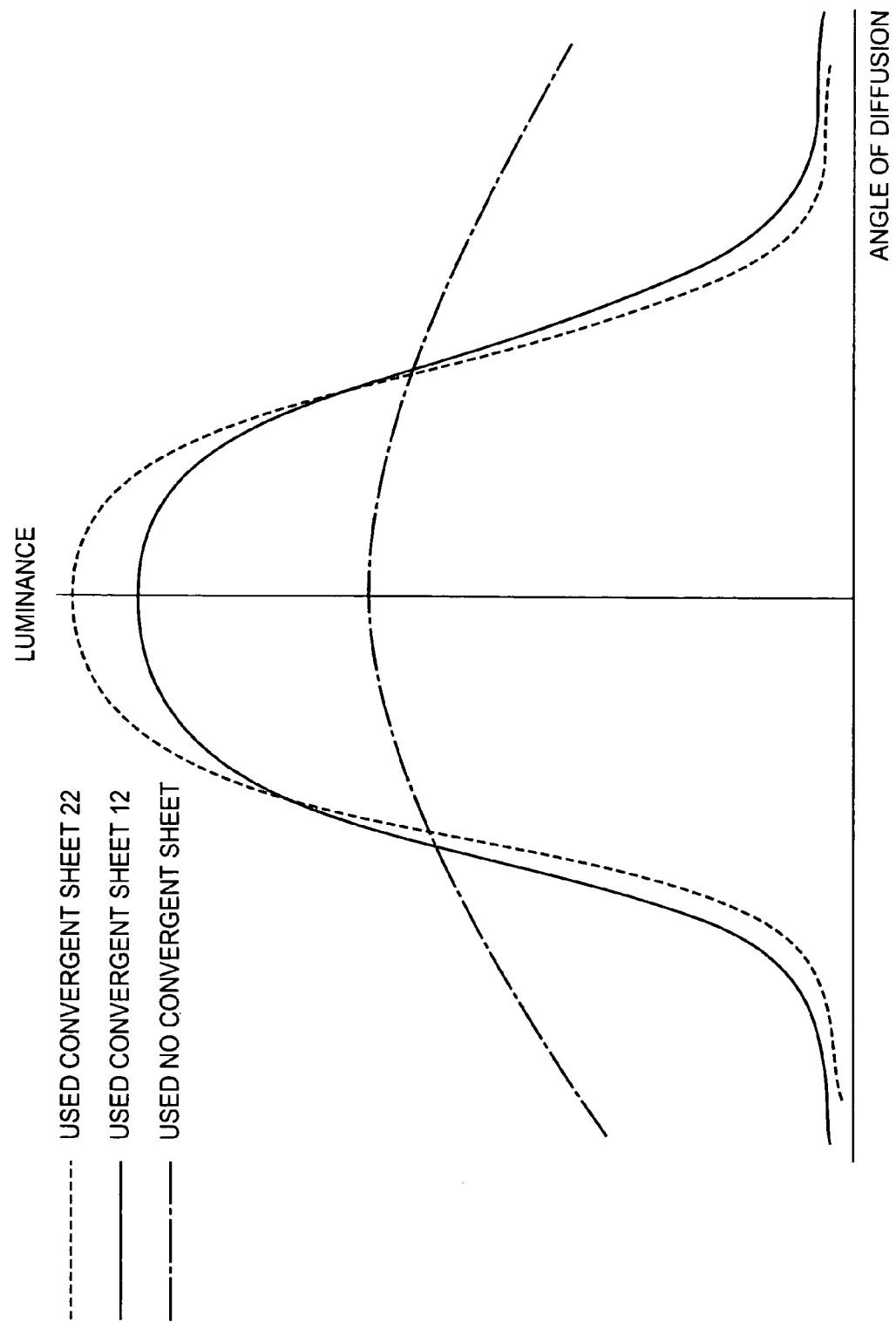
FIG. 21 is a diagram showing the luminance distribution on a surface light source unit comprising the convergent sheet according to the second embodiment of the present invention, in comparison with the luminance distributions on surface light source units of other types.

In FIG. 21, the broken-line curve shows the luminance distribution (luminance distribution in the vertical direction) on the surface light source unit 16 comprising the convergent sheet 22 according to the second embodiment of the present invention; the solid-line curve shows the luminance distribution (luminance distribution in the vertical direction) on the surface light source unit 16 comprising the convergent sheet 12 according to the aforementioned first embodiment; and the chain-line curve shows the luminance distribution (luminance distribution in the vertical direction) on the surface light source unit comprising neither the convergent sheet 12 nor 22.

As shown in FIG. 21, in the above-described first embodiment, the diffused light converges owing to the light-converging effect of the convergent sheet 12, so that the angle of emergence of the light is small, and the luminance on the area on which the diffused light converges is high. The light-converging effect of the convergent sheet 12 can thus be confirmed. When the second embodiment of the present invention (broken line) is compared with the aforementioned first embodiment (solid light), it is clear that the convergent sheet 22 is more excellent than the convergent sheet 12 in the light-converging effect.

Thus, according to the second embodiment of the present invention, by making the upper sides 221a of the light-entering-side unit lenses 221 concave, it is possible to increase the number of light rays that strike the oblique sides (e.g., the oblique sides 221c, 221e) after entering the upper sides 221a, thereby further enhancing the light-converging effect. Further, since the angle of inclination of the oblique side 221e (and 221d) that is situated near the upper side 221a is greater than that of the oblique side 221c (221b), light that has entered the convergent sheet 22 at a greater angle of incidence can converge without producing stray light. Furthermore, owing to the effect of the diffusing sheet 14 placed between the cathode ray tubes 13 serving as a light source and the convergent sheet 22 (see FIG. 1), the display screen of the surface light source unit 16 can be illuminated uniformly regardless of the position on the display screen.

Embodiment 3

A transmission type display according to the third embodiment of the present invention will be described hereinafter with reference to FIGS. 22 to 26B. The third embodiment of the present invention is basically the same as the first embodiment shown in FIGS. 1 to 17, except that, instead of the diffusing sheet 14 according to the first embodiment, a diffusing sheet 24 having a diffusion lens array 241 that is an improvement in shape over the diffusion lens array 141 on the diffusing sheet 14 is used for the surface light source unit in the transmission type display. Like reference numerals designate like or corresponding parts throughout FIGS. 1 to 17 that show the first embodiment and FIGS. 22 to 26B that show the third embodiment, and explanation that has been given already on such parts will be omitted in the following description.

Figure 22:
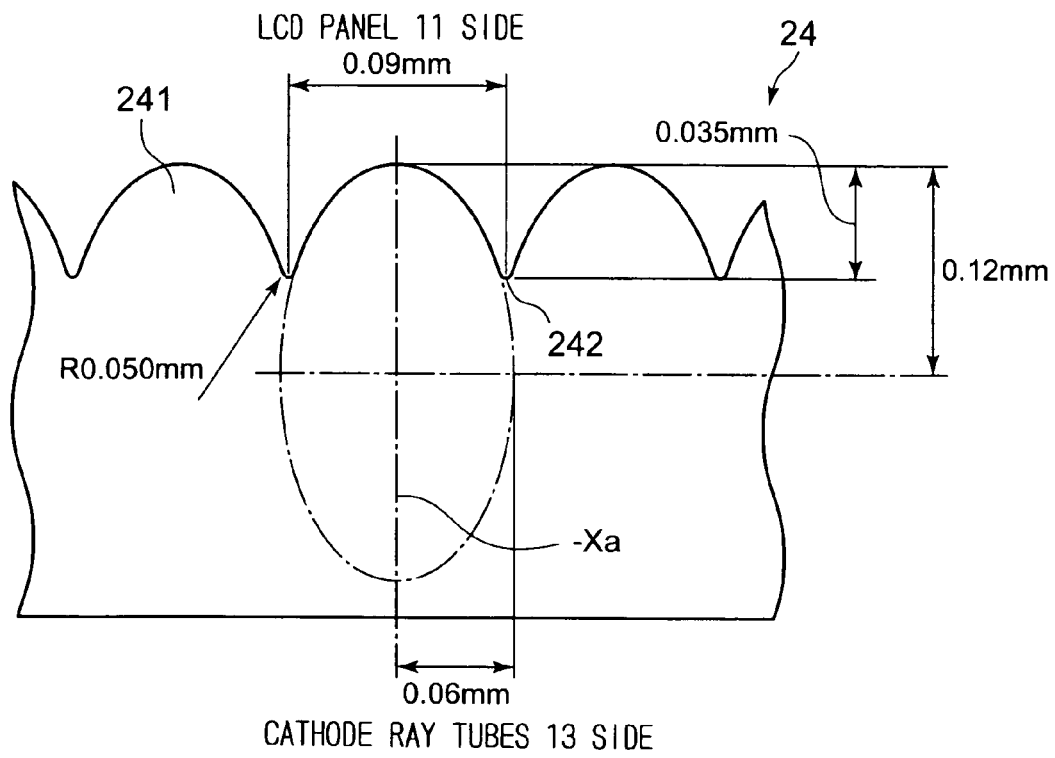
FIG. 22 is an enlarged sectional view of a diffusing sheet contained in a surface light source unit in a transmission type display according to the third embodiment of the present invention.

As shown in FIG. 22, a diffusing sheet 24 according to the third embodiment of the present invention is a sheet for diffusing light from the cathode ray tubes 13 to make the light uniform and has a diffusion lens array 241 on its light-emerging side surface.

The diffusion lens array 241 has a plurality of unit lenses in the shape equivalent to a part of continuous elliptic cylinders having elliptical cross sections. The cross section of each unit lens is in a shape equivalent to a part of an ellipse with a semimajor axis of 0.12 mm and a semiminor axis of 0.06 mm. The diffusion lens array 241 is formed so that the major axis Xa of the elliptical cross section of each unit lens is perpendicular to the sheet face of the diffusing sheet 24, and the unit lenses are arranged with a pitch of 0.09 mm. The diffusing sheet 24 has a thickness of 2 mm and is made from an acryl-styrene copolymer with a refractive index N of 1.55. Alternatively, the diffusing sheet 24 may be made from an ultraviolet light curing resin. In this case, an epoxy acrylate resin may be used, for example.

In the diffusion lens array 241, a concave part 242 that is equivalent to the surface of a cylinder with a radius of 0.050 mm is formed between each two adjacent unit lenses so that it is curved inward toward the LCD panel 11 side. Provided with such concave parts 242, the diffusion lens array 241 can have an increased transmittance for light incident at an angle of about 0°, although the diffusion lens array 241 without these concave parts has an insufficient transmittance for such light, and, at the same time, shows the effect of properly eliminating illumination non-uniformity and the effect of correcting and focusing the direction in which the light emerges. Namely, since the diffusion lens array 241 on the diffusing sheet 24 according to the third embodiment of the present invention is so designed that the effect of correcting light incident at an angle of from 30° to 50° is enhanced, the transmittance of the diffusing sheet 24 for light incident at an angle of about 0° is low if the diffusing sheet 24 has only the diffusion lens array 241 without the concave parts. However, when the concave parts 242 are provided as described above, the diffusing sheet 24 shows, for light incident at an angle of about 0°, the effect of properly eliminating illumination non-uniformity and the effect of correcting and focusing the direction in which the light emerges.

Further, in the case where a concave part 242 with a width of 2 to 5 μm, for example, is formed between each two adjacent unit lenses as described above, a mold for forming the diffusing sheet 24 is to have increased strength. It is therefore possible to prevent deformation of the mold that can occur in the production of the mold.

When the unit lenses in the diffusion lens array 241 are in the above-described shape, their height H is 0.035 mm. Further, as mentioned above, the unit lenses in the diffusion lens array 241 has a width W of 0.09 mm. Therefore, these values of the height and the width fulfill the following formula (2) when the refractive index N is 1.55:

$$\arcsin(1/N) < \arctan(1/((2H/W) - 0.1)) \qquad (2).$$

Figure 23:
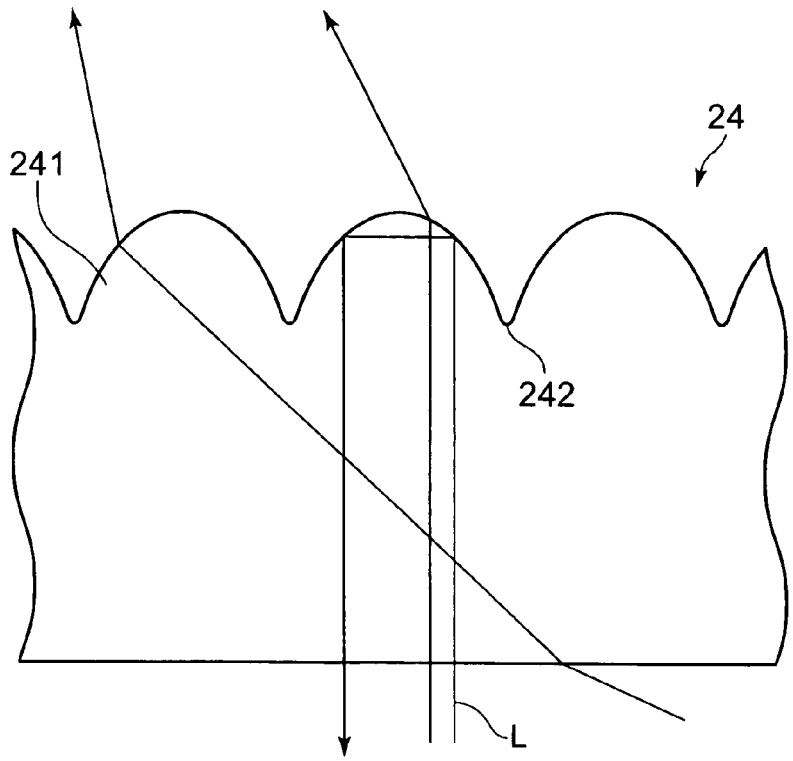
FIG. 23 is a view showing paths which light incident on the diffusing sheet shown in FIG. 22 traces.

The above formula (2) is used for judging whether the light totally reflected from a point on the unit lens in the diffusion lens array 241, situated 10% of the width W apart from the edge of the unit lens, is totally reflected from the top of the unit lens. As shown in FIG. 23, light reaches the top of the unit lens in the diffusion lens array 241 from various directions, and if light that has entered from a certain direction is totally reflected from a trough between two unit lenses in the diffusion lens array 241 and emerges from the top of the unit lens, this light travels obliquely. Therefore, when the display screen is observed from oblique directions, the luminance on the display screen appears non-uniform. However, if the above formula (2) is fulfilled, the luminance on the display screen appears uniform even when the display screen is observed from oblique directions, and, moreover, the enhanced optical efficiency can be obtained.

If the unit lenses in the diffusion lens array 241 are in a shape that does not fulfill the above formula (2), an increased amount of light emerges from the display screen at great angles with the vertical direction, and the reduction in optical efficiency is great. Moreover, since only the illumination light that has entered at limited angles of incidence emerges, such illumination non-uniformity that the positions of the cathode ray tubes 13 serving as a light source can be identified occurs.

Figure 24A:
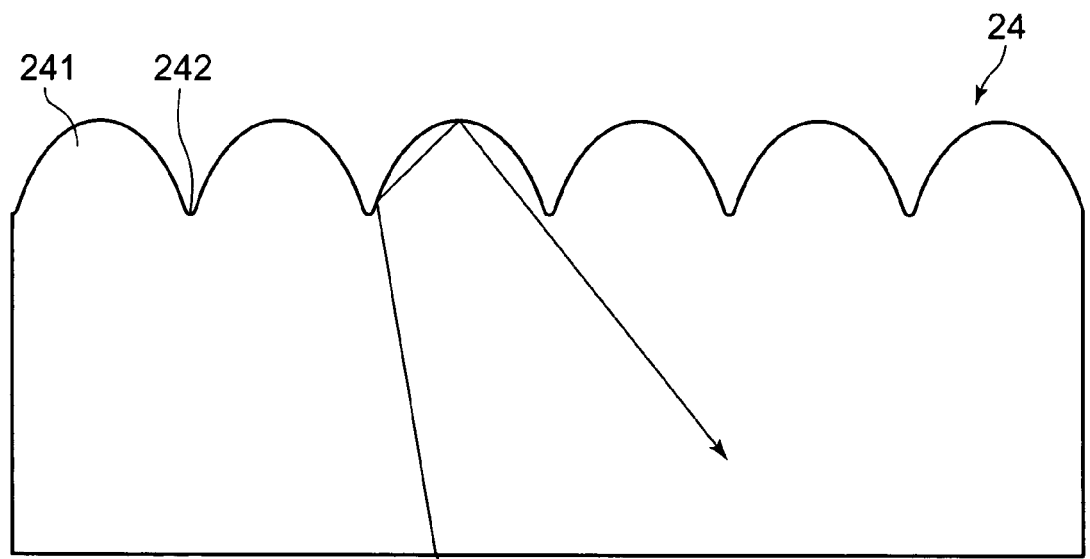
FIGS. 24A and 24B are views showing paths which light traces when the shape of the diffusion lens array on the diffuser shown in FIG. 22 fulfills and does not fulfill the specified formula (2), respectively.
Figure 24B:
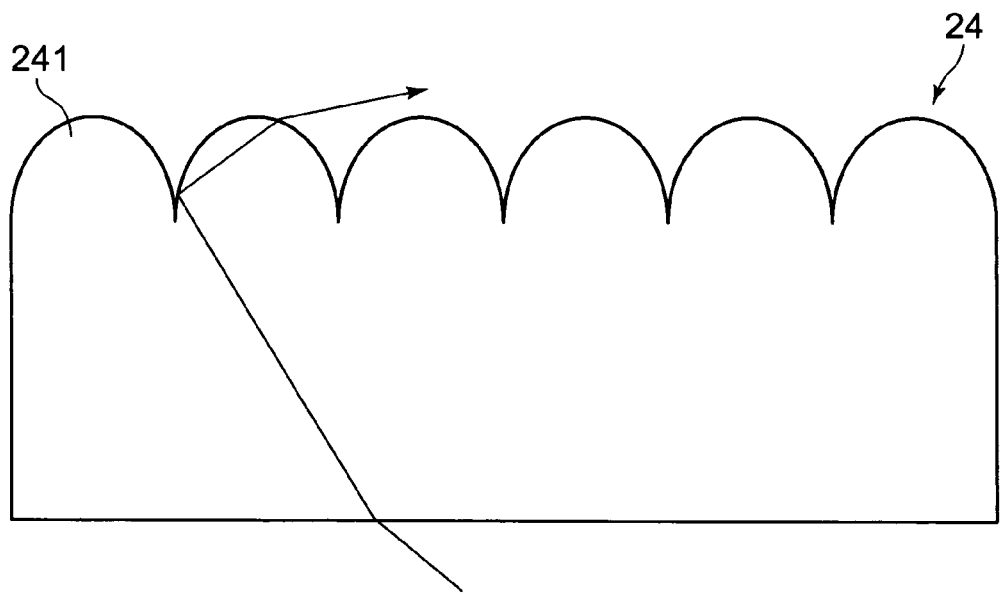

FIGS. 24A and 24B show paths which light traces when the shape of the diffusion lens array 241 on the diffusing sheet 24 shown in FIG. 22 fulfills and does not fulfill the above formula (2), respectively.

As shown in FIG. 24B, when the shape of the diffusion lens array 241 on the diffusing sheet 24 shown in FIG. 22 does not fulfill the above formula (2), the light totally reflected from a point near the edge of the unit lens in the diffusion lens array 241 obliquely emerges from the diffuser 24. On the other hand, as shown in FIG. 24A, if the shape of the diffusion lens array 241 fulfills the above formula (2), the light totally reflected from a point near the edge of the unit lens in the diffusion lens array 241 returns to the light source side and is re-used.

Figure 25:
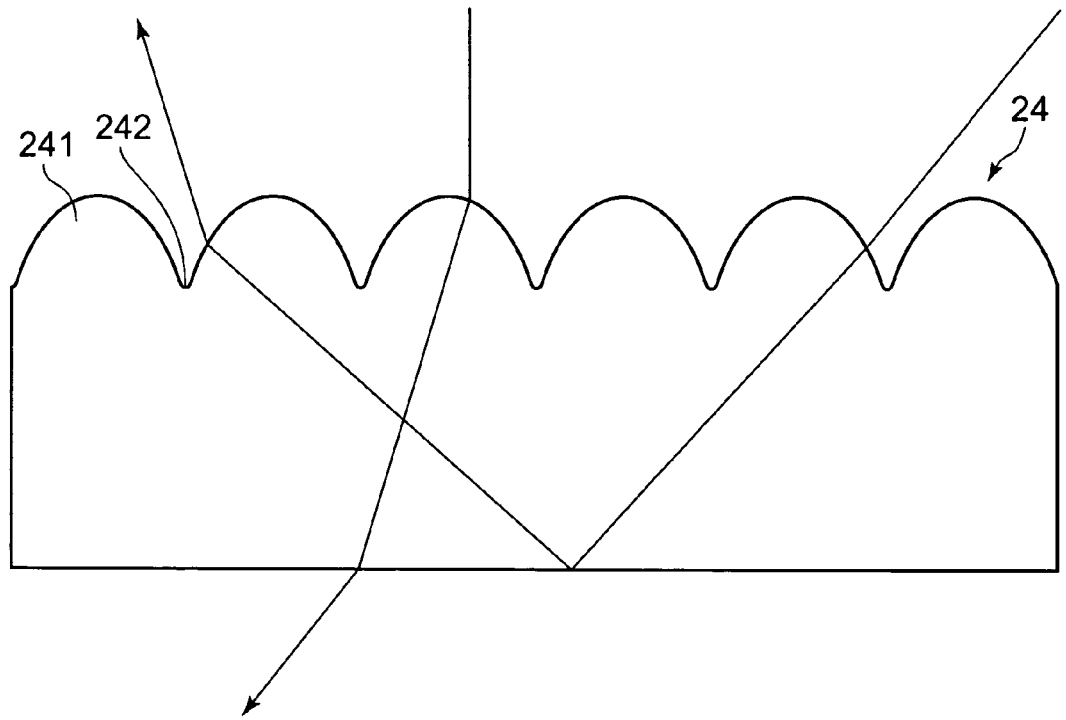
FIG. 25 is a view showing paths which light entering the diffusing sheet shown in FIG. 22 from the observation side traces.

FIG. 25 is a view showing paths which light entering the diffusing sheet 24 shown in FIG. 22 from the observation side traces.

As shown in FIG. 25, light returned to the diffusing sheet 24 after passing through the diffusing sheet 24 and being scatter-reflected from the LCD panel 11, the convergent sheet 12, the reflective polarizer 15, etc. returns to the light source side (the cathode ray tubes 13 side) and can be effectively used, for example, it is re-used or reflected from the diffusing sheet 24 to emerge again as illumination light.

Thus, according to the third embodiment of the present invention, since the shape of the diffusion lens array 241 on the diffusing sheet 24 fulfills the above formula (2), the luminance on the display screen appears uniform even when the display screen is observed from oblique directions, and the enhanced optical efficiency can also be obtained.

Figure 26A:
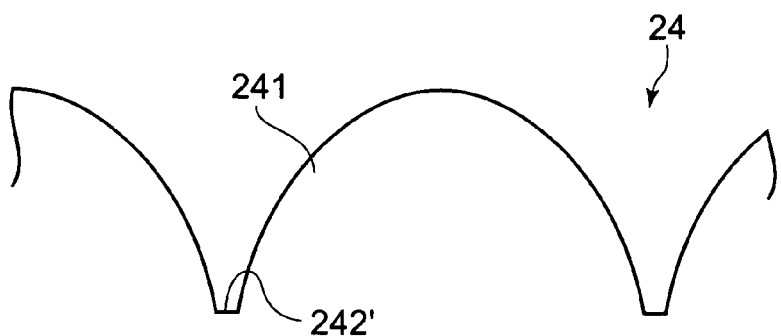
FIGS. 26A and 26B are enlarged sectional views showing modifications of the diffusing sheet shown in FIG. 22.
Figure 26B:
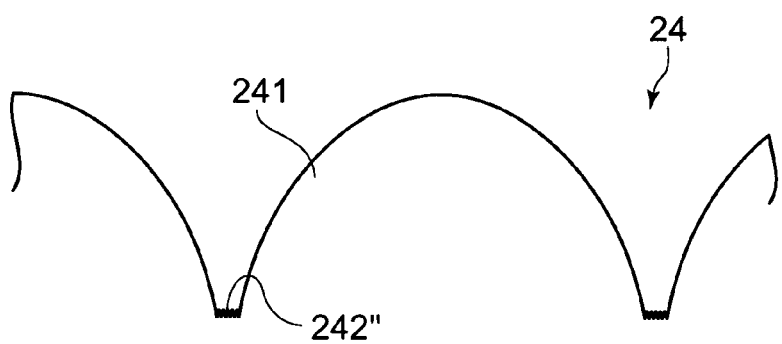

Although the third embodiment of the present invention has been described with reference to the case where the concave part 242 is provided between each two unit lenses on the diffusion lens array 241, a flat part (plane) 242' or a finely roughened part 242" may be provided in place of the concave part 242, as shown in FIG. 26A or FIG. 26B, respectively.

Embodiment 4

A transmission type display according to the fourth embodiment of the present invention will be described with reference to FIG. 27. The fourth embodiment of the present invention is basically the same as the first embodiment shown in FIGS. 1 to 17, except that, instead of the convergent sheet 12 and the diffusing sheet 14 according to the first embodiment, diffusing sheet 44-1 and 44-2 are used for the surface light source unit in the transmission type display. Like reference numerals designate like or corresponding parts throughout FIGS. 1 to 17 that show the first embodiment and FIG. 27 that shows the fourth embodiment, and explanation that has been given already on such parts will be omitted in the following description.

Figure 27:
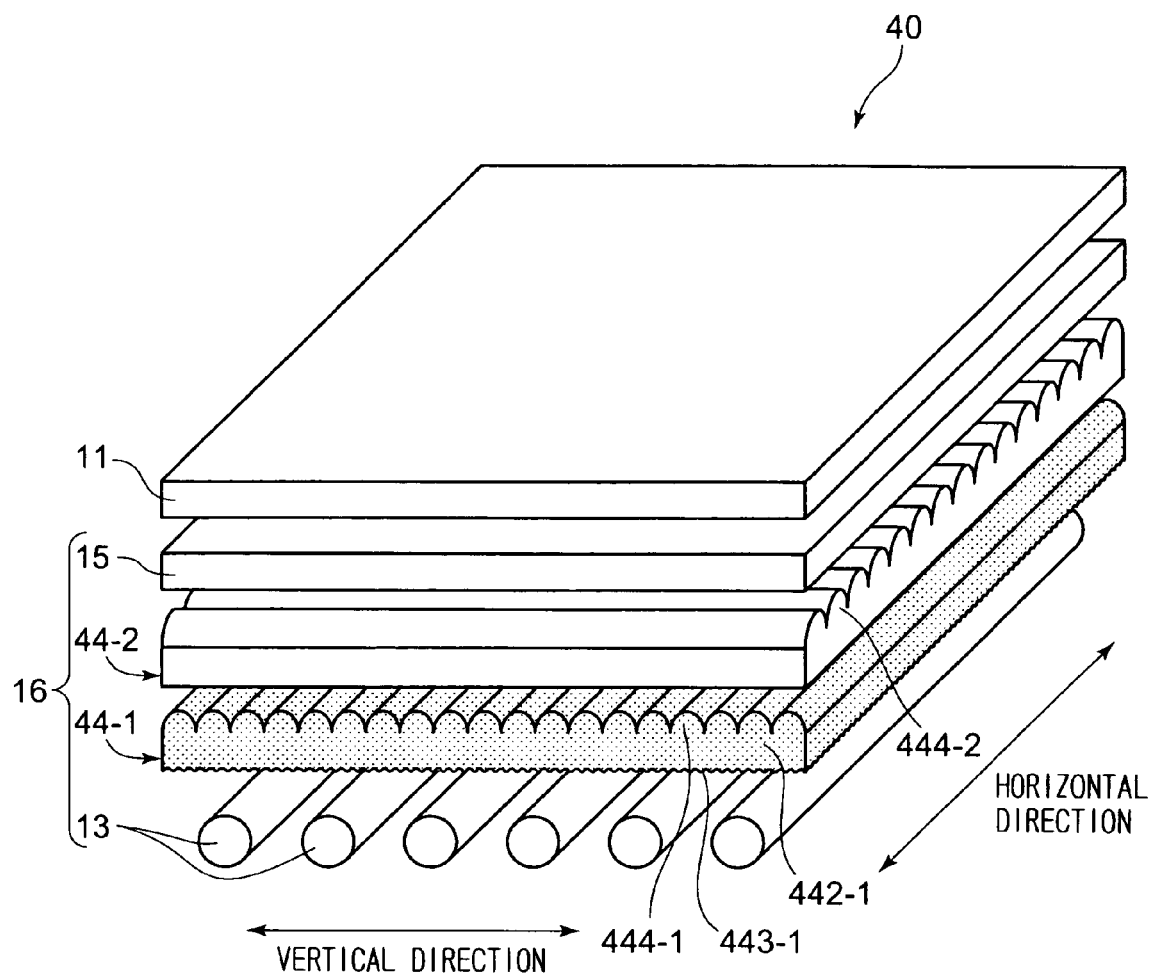
FIG. 27 is a perspective view of a transmission type display according to the fourth embodiment of the present invention.

As shown in FIG. 27, a transmission type display 40 according to the fourth embodiment of the present invention comprises a surface light source unit 16 that illuminates an LCD panel (transmission type display member) 11 from its rear. The surface light source unit 16 comprises a plurality of cathode ray tubes 13 that are arranged in parallel, diffusing sheet 44-1 and 44-2 for diffusing light from the cathode ray tubes to make the light uniform, and a reflective polarizer 15 for increasing luminance without decreasing viewing angle.

The cathode ray tubes 13 are line light sources that constitute a light source member serving as a backlight.

The diffusing sheets 44-1 and 44-2 are sheets that diffuse light from the cathode ray tubes 13 to make the light uniform and constitute a diffusing sheet member.

The diffusing sheet 44-1 has a diffusion lens array 444-1 on its light-emerging side surface. The diffusion lens array 444-1 has a plurality of unit lenses in a shape equivalent to a part of continuous elliptic cylinders having elliptical cross sections. A large number of these unit lenses are arranged in parallel, and the direction in which the unit lenses are arranged agrees with the direction in which the cathode ray tubes 13 are arranged (see FIG. 27). Further, these unit lenses constitute a lenticular lens as a whole. Specifically, the shape of the diffusion lens array 444-1 is the same as that of the diffusion lens array 141 on the diffusing sheet 14 according to the aforementioned first embodiment.

The diffusing sheet 44-1 is made from a resin, and it is preferable that the resin contains light-diffusing fine particles 442-1. It is also preferable that the diffusing sheet 44-1 has, on the light-entering side, a plane of incidence 443-1 with fine irregularities having a light-diffusing action. Owing to the light-diffusing fine particles 442-1 and the plane of incidence 443-1 with fine irregularities, the diffusing sheet 44-1 has a non-directional light-diffusing action in addition to the light-diffusing action given by the diffusion lens array 444-1. It is herein preferable that the light-diffusing action makes the half-angle of diffusion 50°. Owing to this non-directional light-diffusing action, the light source side (the cathode ray tubes 13 side) surface of the diffusing sheet 44-1 slightly has the light-diffusing effect, with which illumination non-uniformity is reduced. If the non-directional light-diffusing action that is imparted to the diffusing sheet 44-1 in addition to the light-diffusing action given by the diffusion lens array 444-1 is excessive, the front luminance is considerably low. It is, therefore, preferable to control the non-directional light-diffusing action so that it makes the half-angle of diffusion 70° or less.

The diffusing sheet 44-2 is placed between the diffusing sheet 44-1 and the reflective polarizer 15. It is a sheet for diffusing, in the direction perpendicular to the direction in which the diffusion lens array 444-1 on the diffusing sheet 44-1 exerts the light-diffusing action, light emerging from the diffusing sheet 44-1, thereby making the light uniform. The diffusing sheet 44-2 has, on its light-emerging side surface, a diffusion lens array 444-2 whose shape is the same as that of the diffusion lens array 444-1 on the diffusing sheet 44-1, provided that the diffusing sheet 44-2 is arranged so that the direction in which the diffusion lens array 444-2 exerts the light-diffusing action becomes perpendicular to the direction in which the diffusion lens array 444-1 on the diffusing sheet 44-1 exerts the light-diffusing action. Namely, in the fourth embodiment of the present invention, the direction in which the unit lenses in the diffusion lens array 444-2 on the diffusing sheet 44-2 are arranged is perpendicular to the direction in which the cathode ray tubes 13 are arranged, as shown in FIG. 27.

The diffusing sheet 44-2 neither contains the light-diffusing fine particles 442-1 that are contained in the diffusing sheet 44-1, nor has fine irregularities on the plane of incidence 443-1, so that it has no non-directional light-diffusing action.

Thus, according to the fourth embodiment of the present invention, the two diffusing sheets 44-1 and 44-2 having the diffusion lens arrays 444-1 and 444-2, respectively, are placed between the cathode ray tubes 13 serving as a light source and the reflective polarizer 15 so that the direction in which the diffusion lens array 444-2 on the diffusing sheet 44-2 exerts the light-diffusing action becomes perpendicular to the direction in which the diffusion lens array 444-1 on the diffusing sheet 44-1 exerts the light-diffusing action. It is, therefore, possible to control light in terms of two directions that are at right angles to each other (longitudinal direction and transverse direction), and to make full use of light, which leads to increase in front luminance. Further, since the viewing angles in the two directions, the longitudinal direction and the transverse direction, are controlled by the different diffusion lens arrays 444-1 and 444-2, it is possible to make the viewing angles ideal and also to increase luminance. Furthermore, since the diffusing sheet 44-1 contains the light-diffusing fine particles 442-1 and has the fine irregularities on the plane of incidence 443-1, it shows the non-directional light-diffusing action. It is therefore unnecessary to separately provide a so-called bead diffuser or the like useful in preventing occurrence of illumination non-uniformity, and it is possible to increase luminance while preventing occurrence of illumination non-uniformity and also to cut cost.

Modification Examples

The present invention has been described by way of the first to fourth embodiments. However, the present invention is not limited to the above-described first to fourth embodiments and includes various modifications and alterations of these embodiments.

Figure 28A:
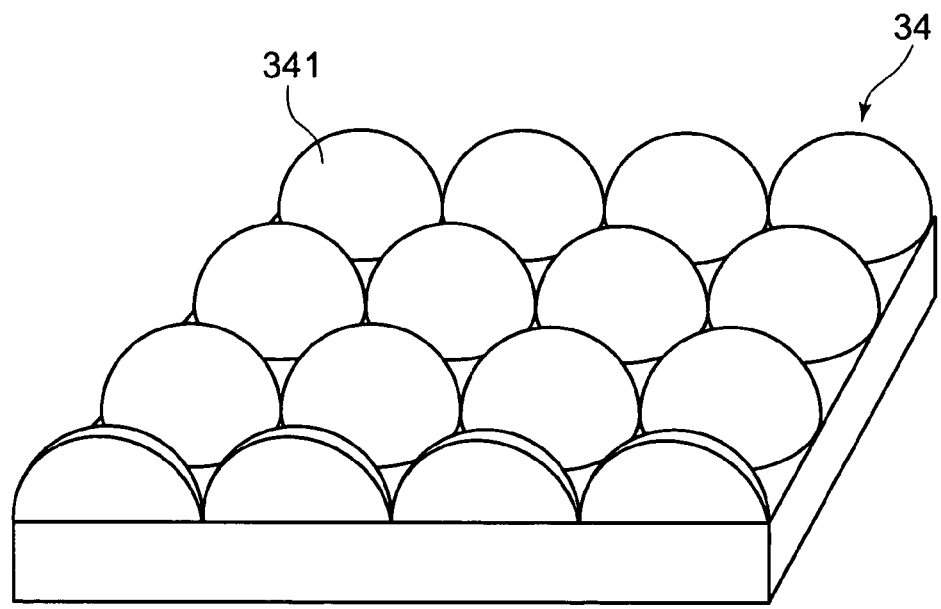
FIGS. 28A and 28B are enlarged sectional views showing modifications of the diffusing sheet contained in the surface light source units in the transmission type displays according to the first to fourth embodiments of the present invention.

(1) In the aforementioned first to fourth embodiments, the unit lenses constituting the diffusion lens array 141, 241, 444-1, 444-2 on the diffusing sheet 14, 24, 44-1, 44-2 are in the shape of a part of continuous elliptic cylinders having elliptical cross sections. The diffusion lens array may also have a plurality of unit lenses in the shape of a part of continuous spheroids having elliptical cross sections, like a diffusion lens array 341 on a diffusing sheet 34 shown in FIG. 28A. In this case, it is preferable that the unit lenses constituting the diffusion lens array 341 be so formed that the major axes of the elliptical cross sections of the unit lenses become perpendicular to the sheet face.

(2) Although in the above-described first to third embodiments, the light-entering side surface of the diffusing sheet 14, 24 is flat, fine irregularities may be made on this surface by embossing or the like, as in the diffusing sheet 44-1 according to the fourth embodiment described above. Moreover, to further enhance the light-diffusing action, a part of the diffusing sheet 14, 24 may contain light-diffusing particles, like the diffusing sheet 44-1 according to the aforementioned fourth embodiment.

Figure 28B:
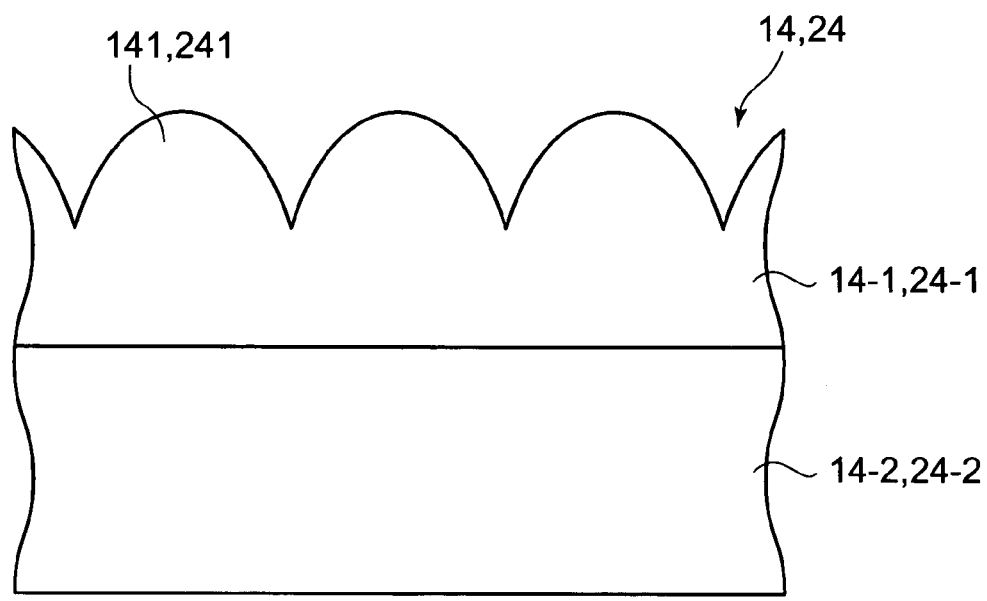

(3) The descriptions of the first to fourth embodiments do not specifically refer to the layer construction of the diffusing sheet 14, 24, 44-1, 44-2 and that of the convergent sheet 12. There is a case where these sheets dry from the cathode ray tubes 13 side due to heat generated by the cathode ray tubes 13 serving as a light source and are unfavorably flexed or warped. To avoid this problem, the diffusing sheet 14, 24 may be made from two or more layers 14-1, 14-2, 24-1, 24-2 having different rates of moisture absorption, which are arranged in such a manner that the layer 14-2, 24-2 situated on the light-entering side has a rate of moisture absorption higher than that of the layer 14-1, 24-1 situated on the light-emerging side, as exemplarily shown in FIG. 28B. If the diffusing sheet is so made, although the diffusing sheet and the convergent sheet are almost flat right after production, they curve outward to the light-entering side to become convex after they have absorbed moisture. Therefore, even when these sheets dry from the cathode ray tubes 13 side due to heat generated by the cathode ray tubes 13, they never curve outward to the light-emerging side to become convex. Besides the above-described means, a spacer may be provided on the light source side (the cathode ray tubes 13 side) in order to solve the problem that the sheets are flexed or warped.

Figure 28C:
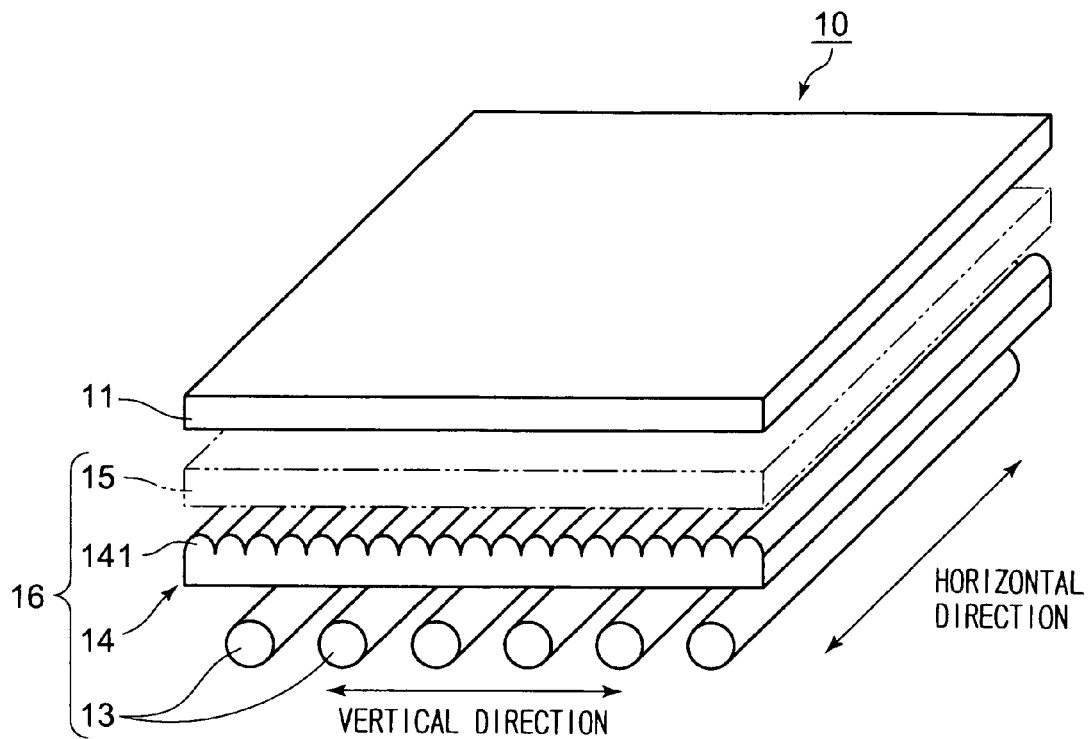
FIGS. 28C and 28D are perspective views showing modifications of the surface light source units in the transmission type displays according to the first and second embodiments of the present invention.
Figure 28D:
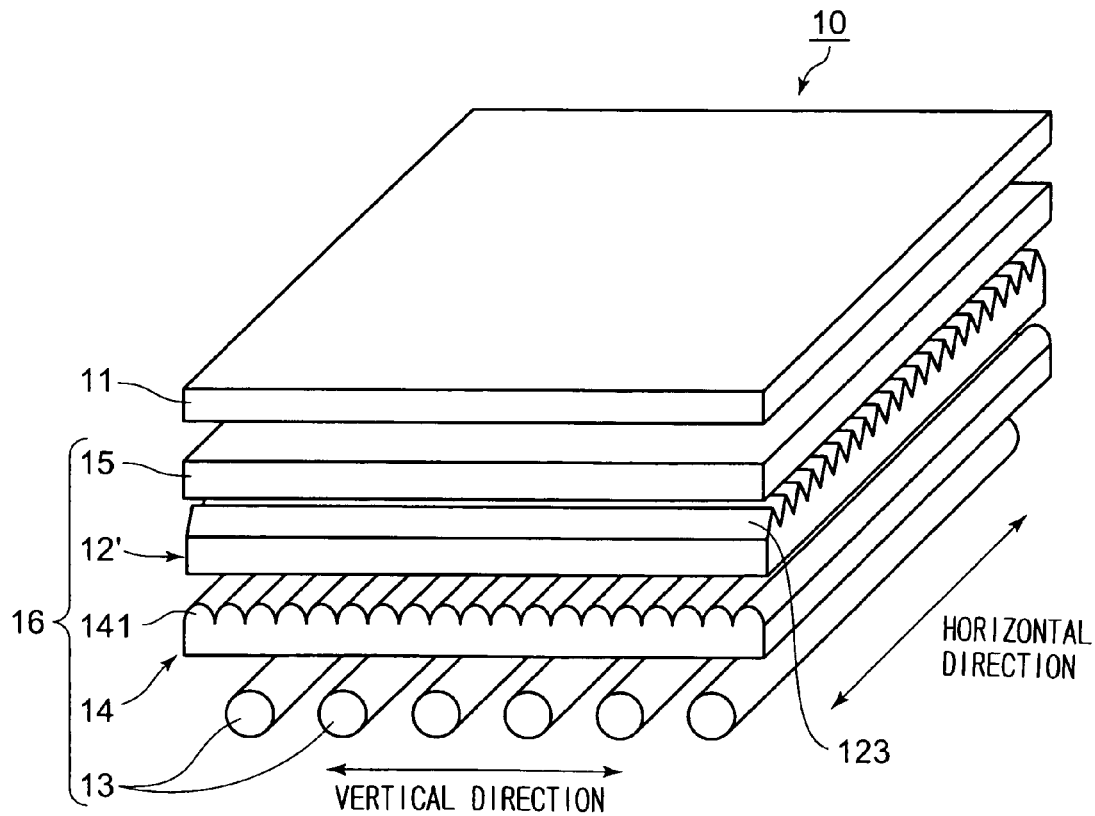

(4) The first and second embodiments have been described with reference to the case where the diffusing sheet 14, 24, the convergent sheet 12, 22 and the reflection polarizer 15 are combined to form the surface light source unit 16, and to form the transmission type display 10 comprising the surface light source unit 16. The present invention is not limited to this, and, for example, the convergent sheet 12, 22 (and the reflective polarizer 15, if necessary) may be omitted, as shown in FIG. 28C, or a convergent sheet 12' having only a convergent lens array 123 may be used as the convergent sheet 12, 22, as shown in FIG. 28D. Moreover, a surface light source unit, and a transmission type display comprising the unit may be obtained by the combination use of a variety of optical sheets other than the above-described ones and the diffusing sheet 14.

(5) The fourth embodiment has been described with reference to the case where the diffusing sheet 44-1, 44-2 are of the same type in which the diffusion lens arrays 444-1, 444-2 are in the same shape. The present invention is not limited to this case, and the diffusion lens arrays of these diffusing sheets may be made different in lens pitch, for example. Moreover, the lens pitch of the diffusion lens array may be varied on the sheet face, or the diffusion lens array may be composed of unit lenses of two or more different types. Three or more diffusing sheets that are the same or different may be superposed one over the other.

(6) The fourth embodiment has been described with reference to the case where the direction in which the unit lenses constituting the diffusion lens array 444-1 on the diffusing sheet 44-1 that is located near the cathode ray tubes 13 are arranged agrees with the direction in which the cathode ray tubes 13 are arranged. The present invention is not limited to this case, and the direction in which the unit lenses constituting the diffusion lens array on the diffusing sheet that is located near the cathode ray tubes 13 may be made perpendicular to the direction in which the cathode ray tubes 13 are arranged, for example.

(7) The fourth embodiment has been described with reference to the case where the diffusing sheets 44-1 and 44-2 are arranged so that the directions in which the diffusion lens arrays 444-1 and 444-2 on the diffusing sheets 44-1 and 44-2 exert their light-diffusing actions are perpendicular to each other. The present invention is not limited to this case, and the diffusing sheets may be arranged so that the directions in which they exert their light-diffusing actions are the same, for example. This arrangement is advantageous in that the diffusing sheets member can have the light-diffusing action enhanced in one direction.

What is claimed is:

1. A diffusing sheet that is used in a surface light source unit of direct type containing a light source member in which a plurality of light sources are arranged in parallel, and that diffuses light from the light sources in the light source member to make the light uniform, said diffusing sheet comprising, at least on its light-emerging side surface, a diffusion lens array having a plurality of unit lenses that allow light from the light sources in the light source member to be diffused within said diffusing sheet and then to emerge from the unit lenses, wherein each unit lens in the diffusion lens array has a width W, a height H, and a refractive index N that fulfill the relationship:

$$\arcsin(1/N) < \arctan(1/((2H/W)-0.1)).$$

2. The diffusing sheet according to claim 1, wherein the unit lenses that constitute the diffusion lens array are at least in one shape selected from shapes equivalent to a part of elliptic cylinders having elliptical cross sections and shapes equivalent to a part of spheroids having elliptical cross sections, and a major axis of the elliptical cross section is perpendicular to a sheet face.

3. The diffusing sheet according to claim 2, wherein a semimajor axis of each unit lens in the diffusion lens array is from 1.5 to 3 times a semiminor axis of the same.

4. The diffusing sheet according to claim 1, wherein between each two adjacent unit lenses in the diffusion lens array is provided a part that is at least in one form selected from flats, concavities, and fine irregularities.

5. The diffusing sheet according to claim 1, having, on a light-entering side, a plane of incidence with fine irregularities having a light-diffusing action.

6. The diffusing sheet according to claim 5, having, in addition to a light-diffusing action given by the diffusion lens array, a non-directional light-diffusing action that makes a half-angle of diffusion 70° or less, owing to the fine irregularities on the plane of incidence.

7. The diffusing sheet according to claim 1, wherein at least a part of the diffusing sheet contains light-diffusing particles.

8. The diffusing sheet according to claim 7, having, in addition to a light-diffusing action given by the diffusion lens array, a non-directional light-diffusing action that makes a half-angle of diffusion 70° or less, owing to the light-diffusing particles.

9. The diffusing sheet according to claim 1, wherein the diffusing sheet is composed of two or more layers having different rates of moisture absorption, and a layer situated on a light-entering side has a rate of moisture absorption higher than that of a layer situated on a light-emerging side on which the diffusion lens array is formed.

10. A surface light source unit that illuminates a transmission type display member from its rear, comprising:
    a light source member in which a plurality of light sources are arranged in parallel; and
    a diffusing sheet according to claim 1, that diffuses light from the light sources in the light source member to make the light uniform.

11. The surface light source unit according to claim 10, wherein the diffusing sheet is placed next to the light source member so that light from the light source member directly enters the diffusing sheet.

12. A transmission type display comprising:
    a transmission type display member; and
    a surface light source unit according to claim 10, that illuminates the transmission type display member from its rear.

13. The diffusing sheet according to claim 1, wherein the light emerging from the unit lenses has a luminous intensity that is uniform.

14. A surface light source unit that illuminates a transmission type display member from its rear, comprising:
    a light source member in which a plurality of light sources are arranged in parallel; and
    a diffusing sheet member that diffuses light from the light sources in the light source member to make the light uniform, the diffusing sheet member being composed of two or more diffusing sheets that are either the same or different, each diffusing sheet in the diffusing sheet member having, at least on its light-emerging side surface, a diffusion lens array having a plurality of unit lenses that allow light from the light sources in the light source member to be diffused and then to emerge from the unit lenses, wherein each unit lens in the diffusion lens array has a width W, a height H, and a refractive index N that fulfill the relationship:

$$\arcsin(1/N) < \arctan(1/((2H/W)-0.1)).$$

15. The surface light source unit according to claim 14, wherein the unit lenses that constitute the diffusion lens array formed on each diffusing sheet in the diffusing sheet member are in either the same shape or different shapes, each shape being equivalent to a part of an elliptic cylinder having an elliptical cross section, and a major axis of the elliptical cross section is perpendicular to a sheet face.

16. The surface light source unit according to claim 15, wherein the two or more diffusing sheets in the diffusing sheet member are arranged so that directions in which the diffusion lens arrays on the diffusing sheets exert their light-diffusing actions are perpendicular to each other.

17. A transmission type display comprising:
    a transmission type display member; and
    a surface light source unit according to claim 14, that illuminates the transmission type display member from its rear.

* * * * *